(12) United States Patent
Chang et al.

(10) Patent No.: US 11,490,693 B2
(45) Date of Patent: Nov. 8, 2022

(54) BITE LINE MARKING FOR AUTOMATED SHOE ASSEMBLY

(71) Applicant: NIKE, Inc., Beaverton, OR (US)

(72) Inventors: Chiung Li Chang, Puxin Township (TW); Yu-Sung Chen, Changhua (TW); Chih-Hung Chiang, Huatan Township (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/424,184

(22) Filed: May 28, 2019

(65) Prior Publication Data

US 2019/0365054 A1 Dec. 5, 2019

Related U.S. Application Data

(60) Provisional application No. 62/678,688, filed on May 31, 2018.

(51) Int. Cl.
*A43D 25/06* (2006.01)
*B41M 1/26* (2006.01)
*B25J 11/00* (2006.01)

(52) U.S. Cl.
CPC .............. *A43D 25/06* (2013.01); *B25J 11/00* (2013.01); *B41M 1/26* (2013.01); *A43D 2200/10* (2013.01)

(58) Field of Classification Search
CPC .......... A43D 25/06; A43D 95/14; A43D 8/22; A43D 8/26; A43D 1/08; B41M 1/32; B41M 1/26; B25J 11/0075
See application file for complete search history.

(56) References Cited

U.S. PATENT DOCUMENTS

| 8,966,775 B2 | 3/2015 | Regan et al. |
| 9,237,780 B2 | 1/2016 | Jurkovic et al. |
| 2014/0081441 A1* | 3/2014 | Regan ................ G05B 19/4097 700/98 |
| 2014/0362079 A1 | 12/2014 | Regan et al. |
| 2015/0201709 A1 | 7/2015 | Jurkovic et al. |
| 2016/0128434 A1 | 5/2016 | Jurkovic et al. |

(Continued)

FOREIGN PATENT DOCUMENTS

| CN | 102125338 A | 7/2011 |
| CN | 104643409 A | 5/2015 |
| CN | 204888929 U | 12/2015 |

(Continued)

OTHER PUBLICATIONS

Ahouokul, "Spring loaded CNC Penholder for Rapidograph technical pens", http://www.instructables.com/id/Spring-loaded-CNC-Penholder-for-Rapidograph-techni/, Published Jul. 10, 2014 (Year: 2014).*

(Continued)

*Primary Examiner* — Jennifer Bahls
*Assistant Examiner* — Quang X Nguyen
(74) *Attorney, Agent, or Firm* — Shook, Hardy & Bacon, L.L.P.

(57) ABSTRACT

A method for assembling a shoe upper and a bottom unit includes digitally determining a bite line on the shoe upper. The method further includes storing a set of data representing the bite line in a computing device. The method also includes utilizing the set of data to automatically indicate the location of an actual physical bite line on the shoe upper.

17 Claims, 21 Drawing Sheets

(56) References Cited

U.S. PATENT DOCUMENTS

2018/0325219 A1 11/2018 Jurkovic et al.

FOREIGN PATENT DOCUMENTS

| CN | 106263285 A | 1/2017 |
| CN | 107307510 A | 11/2017 |
| CN | 206913133 U | 1/2018 |
| DE | 10343620 A1 | 4/2005 |

OTHER PUBLICATIONS

International Preliminary Report on Patentability received for PCT Patent Application No. PCT/US2019/034415, dated Dec. 10, 2020, 12 pages.

International Search Report and Written Opinion dated Nov. 15, 2019 in International Patent Application No. PCT/US2019/034415, 20 pages.

\* cited by examiner

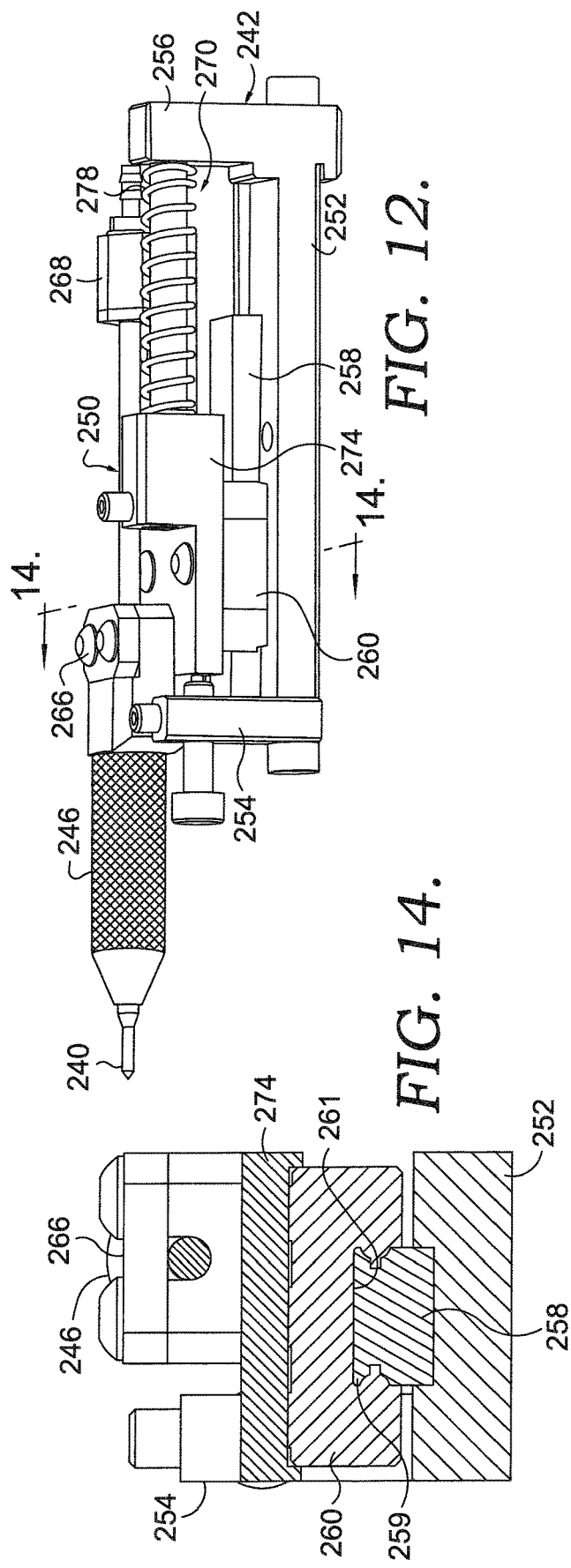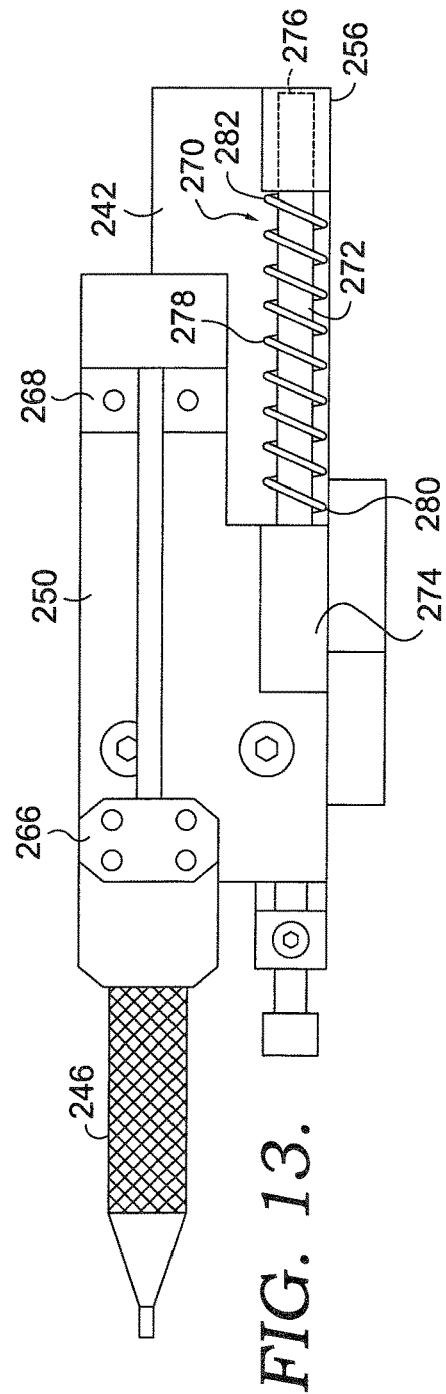

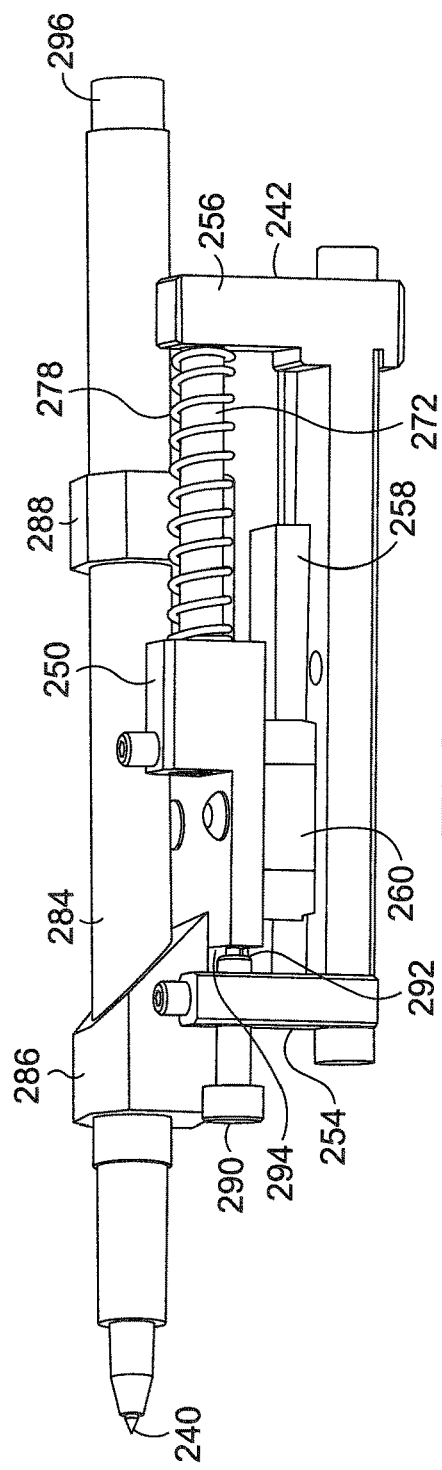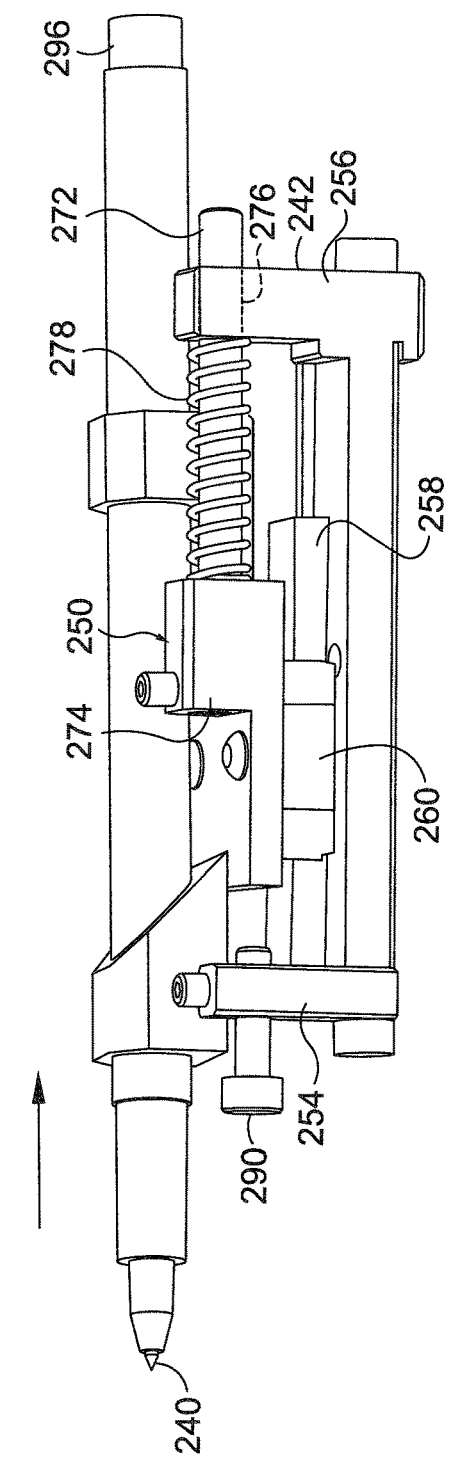

BITE LINE MARKING FOR AUTOMATED SHOE ASSEMBLY

RELATED

This application claims the benefit of priority of U.S. Application No. 62/678,688, titled "Automated Shoe Assembly," and filed May 31, 2018. The entirety of the aforementioned application is incorporated by reference herein

TECHNICAL FIELD

Aspects hereof relate to apparatuses, systems and methods for generating and using a digital representation of article components in connection with articles of footwear, e.g., shoes. More particularly, aspects relate to apparatuses, systems and methods for automatically generating a digital representation of a bite line and utilizing that digital representation to automatically indicate the location of a physical representation of the bite line on the shoe upper.

BACKGROUND

Articles of footwear and, in particular, shoes may be made by combining components, such as uppers and bottom units, which may themselves be comprised of subcomponents. For instance, a shoe bottom unit may be comprised of a midsole and an outsole. Various techniques, such as the use of adhesives and/or cements, may be used to join one component, such as a shoe upper, to another component, such as a shoe bottom unit. In order to ensure proper placement of the shoe upper with a shoe bottom unit, it has been found to be advantageous to have a physical representation of the bite line on the shoe upper. Further, in order to enhance the connection between the upper and the bottom unit, it has been found to be advantageous to buff or smooth the areas of the upper that are in contact with the bottom unit and to which adhesive is applied.

BRIEF SUMMARY

Aspects hereof provide a method for automatically assembly of a shoe. The method includes digitally determining a bite line on the shoe upper and storing a set of data representing the bite line in a computing device. The set of data is used to automatically indicate the location of an actual physical bite line on the shoe upper.

Additional aspects provide a method for automatically drawing a bite line on a shoe upper. A computing device is accessed to provide a set of data representing a digital bite line. A robotic arm is utilized to support a marking instrument and is actuated to physically mark a bite line on the shoe upper. The physical bite line represents the digital set of data. The marking instrument is maintained at an angle in the range of 45 degrees to 75 degrees between the marking instrument and the surface of the shoe upper.

Further aspects include an apparatus for automatically marking a bite line on a shoe upper including a robotic arm capable of being articulated around the shoe upper and having a distal end capable of engagement with a surface of the shoe upper. The distal end of the robotic arm has a marking instrument positioned thereon that has a marking tip for engaging the surface of the shoe upper and for drawing the bite line. The marking instrument includes a base member and a carriage moveably mounted with respect to the base member. The base member is coupled to the distal end of the robotic arm and the carriage is coupled to the marking tip. The carriage and marking tip move with respect to the base member for adjustment as the marking tip engages the surface of the shoe upper.

DESCRIPTION OF THE DRAWINGS

The present invention is described in detail herein with reference to the attached drawing figures, wherein:

FIG. 12 depicts a perspective view of a marking instrument, in accordance with exemplary aspects hereof;

FIG. 13 depicts a top plan view of the marking instrument of FIG. 12, in accordance with exemplary aspects hereof;

FIG. 14 depicts a cross sectional view taken along line 14-14 of FIG. 12, in accordance with exemplary aspects hereof;

FIG. 15 depicts a perspective view of an alternative marking instrument similar to the marking instrument in FIG. 12, in accordance with exemplary aspects hereof;

FIG. 16 depicts a perspective view similar to FIG. 15 with the biasing mechanism in a retracted position, in accordance with exemplary aspects hereof;

DETAILED DESCRIPTION

As a result of the desires for protection and support from an upper, cushioning from a midsole, and traction and durability from an outsole, a given shoe may utilize diverse materials and structural designs for these different components. Further, additional components that provide, for example, particularized impact protection, motion control for pronation or supination, varying degrees of support, additional impact protection, and the like may further complicate the design of all or part of a shoe. Nevertheless, these components must be ultimately integrated to form a wearable shoe that is both functional and, ideally, attractive.

One approach to shoe component integration is to use one or more adhesives to affix an outsole and a midsole together and then to use different or similar adhesives to affix the sole assembly (often simply referred to as a "bottom unit" or "sole") to the upper. When using such an approach, however, care must be taken to provide sufficient adhesive coverage and bonding force between the bottom unit and the upper in order to create an acceptably strong bond.

Figure 1:
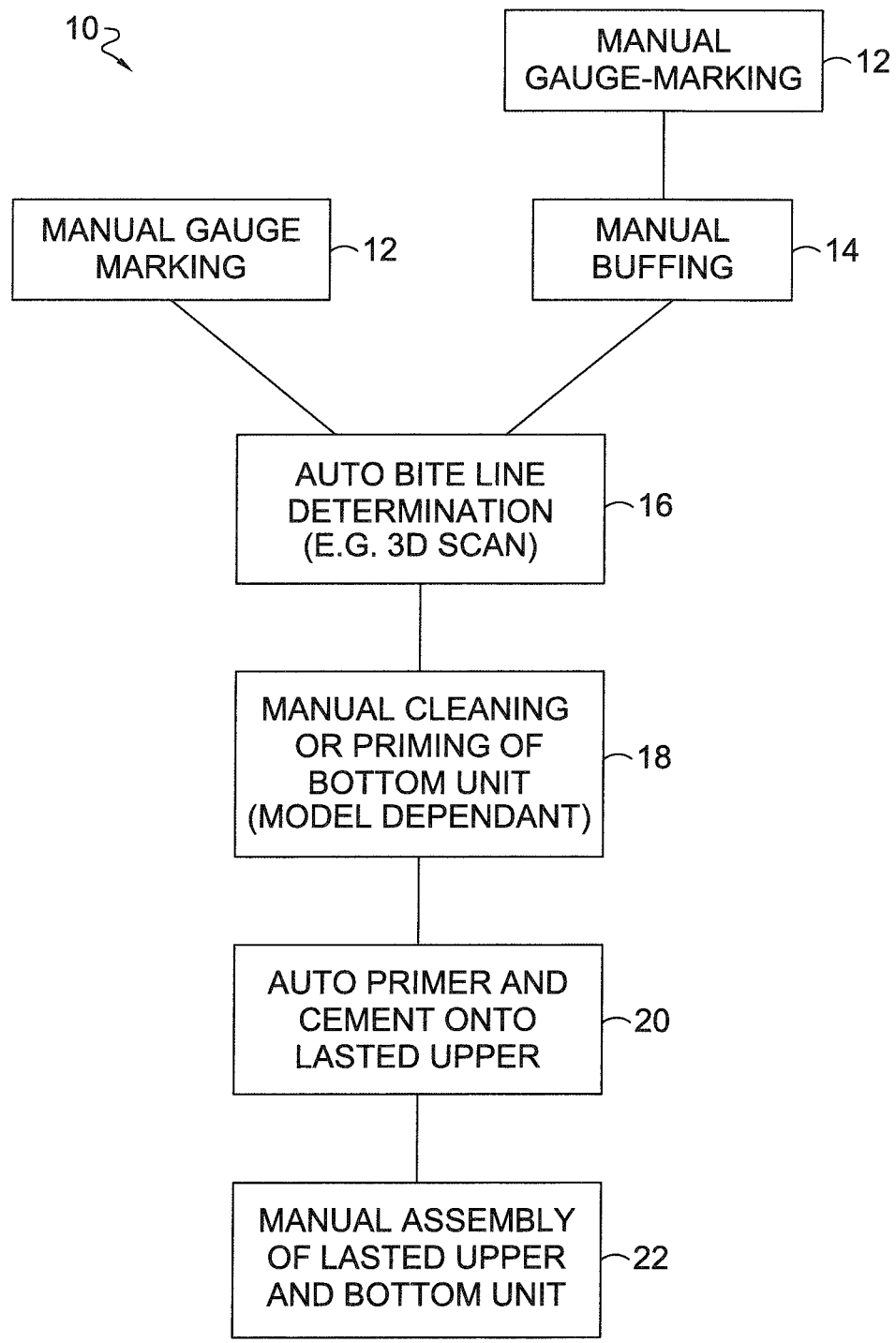
FIG. 1 depicts a prior art system and method for assembling a shoe.

Referring to FIG. 1, a prior art partially automated system and method 10 of assembling a shoe upper with a bottom unit is depicted. More specifically, the prior art method includes as a first step for manual gauge marking 12 of the shoe upper. This step entails manually and temporarily mating a lasted shoe upper with a bottom unit and providing sufficient force such that the mating replicates a final finished shoe product with the shoe upper and bottom unit permanently connected. Once this temporary connection is accomplished, a worker manually traces on the lasted shoe upper along where the upper edge of the bottom unit meets the shoe upper, thus creating a visually perceptible bite line actually on the shoe upper. In some instances the physical bite line will be drawn on the shoe upper in such a way that the bite line will have to be chemically or physically scrubbed off the upper after the shoe assembly is complete. In other instances, the bite line is drawn with a type of ink that is auto vanishing. In other words, the ink is visually perceptible when drawing, but fades over time to become essentially invisible. Another type of physical application of a bite line is drawing the bite line with an ink that is only visually perceptible under ultraviolet or iridescent light or radiation.

The next step of the prior art method includes an optional manual buffing 14 of the lasted shoe upper. As is shown in FIG. 1, there are models of shoes where a buffing operation will not be necessary. With certain types of shoe upper materials, the buffing operation ensures that the adhesive or cement used to attach the shoe upper to the bottom unit adequately engages the shoe upper. The buffing operation accomplishes this by roughing up the surface of the shoe upper with a powered rotary tool. This action is accomplished manually and a worker utilizes the physically marked bite line to guide the buffing action. More specifically, the buffing of the shoe upper should only take place on the side of the bite line that will be covered by the bottom unit, that is the area associated with the bottom of the shoe upper. This ensures adequate connection between the shoe upper and the bottom unit and further does not discolor or scuff the visually perceptible areas of the shoe upper in the finished shoe product.

The next step is the automated determination of a bite line 16. The automatic determination of a bite line is done by utilizing a three dimensional scan of the lasted shoe upper with the bottom unit temporarily positioned thereon. Further, a three dimensional scan of just the lasted shoe upper is performed. The three dimensional scan of the combination of the shoe upper and the bottom unit is compared with the scan of just the lasted shoe upper to determine a divergence or convergence of data points. The divergence or convergence of data points represents a digital representation of the bite line.

As is apparent, there are two different determinations of the bite line in the prior art method 10, the first manual gauge marking 12 and the auto bite line determination 16. As will be more fully described below, this creates inefficiencies in the shoe manufacturing because it includes the manual process of a worker having to draw the bite line on the upper by hand.

There are additional inefficiencies in the prior art method with that manual buffing of the lasted shoe upper. This is a labor intensive process that require a particular amount of skill on behalf of a worker.

Next in the prior method is an optional step of manually cleaning or priming the shoe bottom unit 18. Oftentimes there are burs or chat remaining on the bottom unit after the molding process. It is sometimes necessary to remove these inconsistencies and prepare the upper surface of the bottom unit for bonding to the shoe upper.

The next step in the prior method is the automated spraying 20 of the primer and/or the cement onto the lasted shoe upper. This spraying takes place utilizing a robotic arm and utilizing the digital bite line determined in step 16 to guide the spraying. More specifically, the data representing the digital bite line is used by the spraying robot to guide a spray nozzle around the upper and to ensure that the primer/cement/adhesive does not get applied in the area of the shoe upper not covered by the bottom unit. Because the spraying step is automated, the digital bite line is used to direct the robotic spraying arm on a correct tool path. The manually drawn bite is not used in this spraying process.

The last step in the prior method is the manual assembly 22 of the lasted shoe upper and the bottom unit. This is accomplished by workers positioning and aligning the lasted shoe upper on the bottom unit and apply a preferred amount of pressure to the combined unit. The physically drawn bite line is used to ensure this proper alignment. It is desirable to manually ensure the lasted shoe upper and the bottom unit are aligned. This is accomplished by providing and using a bite line actually drawn on the lasted shoe upper.

As is apparent, the prior art method involves three or more manual operations, the manual gauge marking 12, the manual buffing operation 14, the manual cleaning and priming of the bottom unit 18, and the manual assembly 22 of the lasted shoe upper on the bottom unit. These manual operations often require skilled workers in order to be performed.

There is an automatic bite line determination 16 performed, but the digital bite line created in this operation is not used for a physical bite line drawing operation or for a buffing operation. It is used for the spraying operation. As discussed above, in order to facilitate the manual assembly of the lasted shoe upper with the bottom unit, it is desirable to have an indication of the location of the physical bite line on the shoe upper itself.

Aspects hereof relate to apparatuses, systems and methods for generating and using a digital representation of article components in connection with the manufacture of articles of footwear. A digital representation of a bite line is generated and used to automatically draw a physical representation of the bite line and/or to automatically buff a portion of the shoe upper. Thus, manual operations associated with physical bite line drawing and manual buffing are eliminated.

In a first aspect hereof, a method is provided for automatically assembling a shoe. The method includes digitally determining a bite line on the shoe upper and storing a set of data representing the bite line in a computing device. The set of data is used to automatically indicate a location an actual physical bite line on the shoe upper.

Additional aspects provide a method for automatically drawing a bite line on a shoe upper. A computing device is accessed to provide a set of data representing a digital bite line. A robotic arm is utilized to support a marking instrument and is actuated to physically mark on the shoe upper a bite line. The physical bite line represents the digital set of data. The marking instrument is maintained at an angle in the range of 45 degrees to 75 degrees between the marking instrument and the surface of the shoe upper.

Further aspects include an apparatus for automatically marking a bite line on a shoe upper including a robotic arm capable of being articulated around the shoe upper and having a distal end capable of engagement with a surface of the shoe upper. The distal end of the robotic arm has a marking instrument positioned thereon that has a marking tip for engaging the surface of the shoe upper and for drawing the bite line. The marking instrument includes a base member and a carriage moveably mounted with respect to the base member. The base member is coupled to the distal end of the robotic arm and the carriage is coupled to the marking tip. The carriage and marking tip move with respect to the base member for adjustment as the marking tip engages the surface of the shoe upper.

While the examples of shoe uppers and shoe soles are presented in a simplified fashion for exemplary purposes herein, in practice a shoe upper may comprise a large number of individual parts, often formed from different types of materials. The components of a shoe upper may be joined together using a variety of adhesives, stitches, and other types of joining components. A shoe sole may be comprised of multiple components. For example, a shoe sole may comprise an outsole made of a relatively hard and durable material, such as rubber, that contacts the floor, ground, or other surface. A shoe sole may further comprise a midsole formed from a material that provides cushioning and absorbs force during normal wear and/or athletic training or performance. Examples of materials often used in midsoles are, for example, ethylene vinyl acetate foams, polyurethane foams, and the like. Shoe soles may further have additional components, such as additional cushioning components (such as springs, airbags, and the like), functional components (such as motional control elements to address pronation or supination), protective elements (such as resilient plates to prevent damage to the foot from hazards on the ground or floor), and the like. As can be appreciated, it is contemplated that when a sole is mated with a lasted upper for bite line detection, the sole may comprise the outsole, the midsole, and/or any additional components forming a shoe sole. While these and other components that may be present in a shoe upper and/or a shoe sole are not specifically described in examples set forth herein, such components may be present in articles of footwear manufactured using systems and methods in accordance with aspects hereof.

Figure 2:
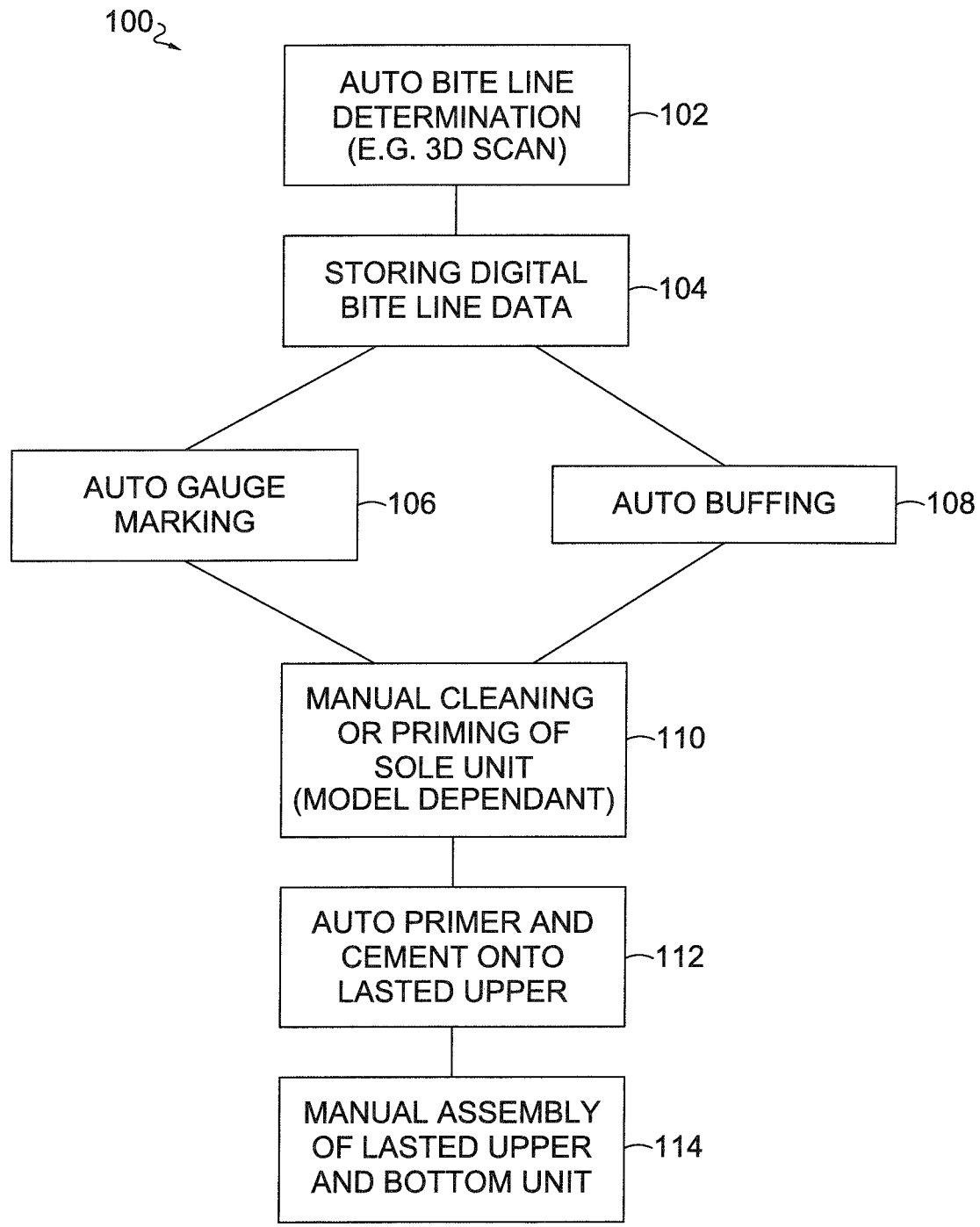
FIG. 2 depicts a system and method of assembling a shoe, in accordance with exemplary aspects hereof.

Referring to FIG. 2, a method 100 of utilizing a digital bite line for automated drawing of a bite line and for automated buffing is depicted. A first step is to automatically determine the bite line 102 of the lasted shoe upper. As will be more fully described herein, this step results in the generation of a data set that digitally represents the bite line of the shoe. The data set representing the bite line is then stored 104 in a computing device for use with other operations. The data set representing the bite line can be used for a number of different alternative operations to indicate the location of an actual physical bite line on a shoe upper. For example, in one alternative, the data set representing the bite line is used to automatically draw a physical bite line on the shoe upper in the automatic gauge marking step 106, as will be more fully described herein. Still further, as another alternative, the same data set representing the bite line is used in the automatic buffing step 108 to utilize a robotic arm or other suitable automatic device to prepare certain portions of the shoe upper for application of adhesive. As a result of the automatic buffing step 108, an indication of the location of the actual physical bite on the shoe upper is provided. More specifically, after a region/zone of an upper has been automatically buffed in step 108, the edge of the buffing region/zone that is furthest away from the bottom of the upper will indicate the location of the physical bite line. Thus, as is apparent, if the automatic buffing step 108 is utilized, it may not be necessary to perform the automatic gauge marking step 106. However, if the automatic buffing step 108 is not necessary, then it may be desirous to perform the automatic gauge marking step 106. The method 100 can also include a manual cleaning and priming step 110 of the bottom unit if necessary. This step may not be necessary with some models of shoes.

The next step is the automatic spraying or brushing 112 of the primer and/or the cement onto the lasted shoe upper. This spraying/brushing takes place utilizing a robotic arm and utilizing the digital bite line determined in step 102 to guide the spraying and or brushing. The data set representing the digital bite line is used by the robotic arm to guide a spray nozzle and or brush around the upper and to ensure that the primer/cement/adhesive does not get applied in the area of the shoe upper not covered by the bottom unit.

The last step is the assembly 114 of the lasted shoe upper and the bottom unit. This can be accomplished by workers positioning and aligning the lasted shoe upper on the bottom unit and applying a preferred amount of pressure to the combined unit. This assembly step 114 can also be performed automatically by, for instance, a robotic arm or arms. The automatic assembly also includes the automatic application of the preferred amount of pressure to the combined unit. The indication of the location of the physically drawn bite line from the automatic gauge marking step 106 can be used to ensure proper alignment. Alternatively or in addition to, the indication of the location of physical bite line from the edge of the buffing region from automatic buffing step 108 can be used to ensure proper alignment. It is desirable to manually and/or automatically ensure the lasted shoe upper and the bottom unit are aligned and the way of accomplishing this step is by providing and using an indication of the location of the physical bite line on the lasted shoe upper, whether the indication be from automatic gauge marking step 106 or automatic buffing step 108.

Referring to FIGS. 3-9, one exemplary structure for carrying out the automatic determination of the bite line 102 will be described. As described above, a bite line is a location along the intersection of a shoe sole bottom unit and a shoe upper. Traditionally, in the manufacturing of footwear, a bite line is identified by placing the bottom unit that will be coupled with the shoe upper along the bottom of the lasted shoe upper to identify the bite line. The bite line determination is desired in order to determine a location up to which one or more bonding agents may be applied to the lasted upper without exposing the bonding agent after the assembly of the upper and the bottom unit. As describe herein, automation of the process may benefit from providing a digital representation of a digital bite line for a particular shoe upper. One example, provided herein provides means for identifying a bite line digitally for a particular shoe upper through a divergence detection process involving a first set of three-dimensional surface information of a lasted upper and a bottom unit in a mated configuration and also a second set of three-dimensional surface information of the lasted upper unmated with the bottom unit. The first set and the second set of three-dimensional surface information, when compared to one another, identify an intersection of the sole on the lasted upper when mated, which represents, at least in part, the bite line for the lasted upper, in an exemplary aspect. This identification may be accomplished by overlaying the data points representing the three-dimensional surfaces of the mated configuration and the unmated configuration to locate a divergence of data points beyond a predefined threshold. At this divergence of overlaid data points, a change in the surface geometry from the mated configuration to the unmated configuration may be determined, which may occur at the bite line, in an exemplary aspect. Once a bite line is determined for a lasted shoe upper, the data set defining the bite line may be used by a machine, such as a multi-axial robot, to perform operations on the shoe upper and/or bottom unit.

Figure 3:
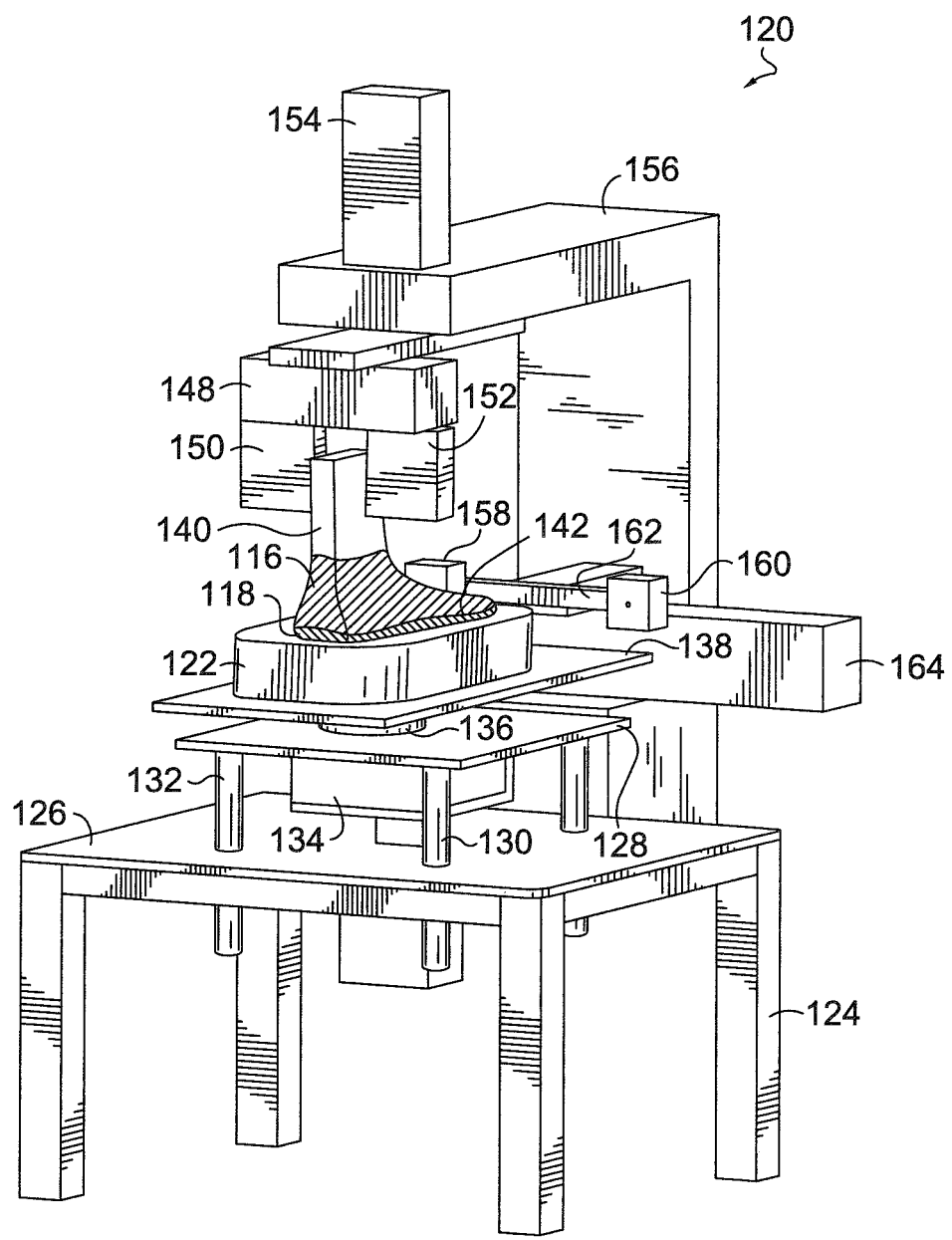
FIG. 3 depicts an exemplary system that is effective for capturing three-dimensional surface information of a lasted upper and a bottom unit, in accordance with exemplary aspects hereof.

Referring now to FIG. 3, an exemplary system that is effective for capturing three-dimensional surface information of a lasted upper 116 and a bottom unit/sole 118 in accordance with aspects hereof is illustrated and designated generally as reference numeral 120. Such a system is disclosed in U.S. Publication No. 2015/0201709 (U.S. application Ser. No. 14/161,283) which is hereby incorporated herein by reference. As will be discussed in more detail herein, a maintainer 122, such as a silicone pad having a cavity formed therein for receiving the bottom unit 118, may be used to maintain and secure the bottom unit 118 for the mated and unmated data capture. The system 120 is comprised of a base support 124 having a top surface 126. The base support 124 may be a configuration effective for supporting one or more of the components discussed hereinafter for use in a system, such as the system 120.

The system 120 is further comprised of a vertical assembly that is effective to raise and lower the bottom unit 118 from a mated to an unmated configuration. The vertical assembly is comprised of a support plate 128 that is slidably coupled with the top surface 126 of the base support 124 by way of guide members 130, 132. The guide members slidably interact with the top surface 126 to provide stability to the support plate 128 and components coupled thereto while still facilitating a vertical motion of the support plate 128. The vertical motion is actuated by a vertical actuator 134. The vertical actuator 134 is configured to raise and lower at least the support plate 128 to consequently allow for the mating and unmating of the bottom unit 118 and the lasted upper 116. The vertical actuator 134 may cause vertical movement using a number of mechanisms, such as pneumatic, hydraulic, linear motors, and the like. As depicted, a portion of the vertical actuator 134 extends through the top surface 126 to interact with the support plate 128. In alternative aspects, it is contemplated that the vertical actuator 134 may be configured in alternative manners to achieve a movement of the bottom unit 118 from a mated to an unmated configuration.

As depicted, the maintainer 122 may be configured such that at least a portion of the bottom unit 118 is positioned within a cavity of the maintainer 122. However, it is contemplated that at least a portion of the bottom unit 118 proximate a superior edge of the bottom unit 118 extends above the maintainer 122 to allow for three-dimensional data capture of the lasted upper 116 and the bottom unit 118 at the bite line. The maintainer 122 may be formed from any suitable material, such as silicone. The maintainer 122 may be configured of any size and shape such that the intersection between the bottom unit 118 and the lasted upper 116 is able to be captured effectively by a sensing assembly. Further, it is contemplated that the maintainer 122 may be omitted entirely in exemplary aspects hereof.

The vertical assembly is further comprised of a swivel 136 rotationally coupling the support plate 128 with a rotational plate 138. The swivel 136 allows the rotational plate 138 to rotate independently of the support plate 128. As will be discussed hereinafter, the bottom unit 118 may be engaged with the lasted upper 116 as the lasted upper 116 rotates. As the bottom unit 118 is in contact with and supported by the rotational plate 138 via the maintainer 122 in an exemplary aspect, the swivel 136 allows for the rotational plate 138 and the bottom unit 118 to rotate freely of the support plate 128. As the vertical assembly is positioned at different vertical positions, components of the vertical assembly move in unison to achieve a mating an unmating configuration of the bottom unit 118 and the lasted upper 116.

In the illustrated system 120, the shoe upper 116 has been placed on a last 140, which historically provides a volumetric approximation of an intended shaping of the shoe upper. The bottom unit, by way of the vertical assembly, may apply a predetermined amount of force to retain the lasted upper 116 against the corresponding bottom unit 118. Upon applying the pressure, the bottom unit 118 is mated with the lasted upper 116. Once mated with the desired pressure, an intersection between the lasted upper 116 surface and the bottom unit surface 118 forms an intersection 142. The intersection 142 represents a location of a bite line for the lasted upper 116.

It should be noted that, in processing, the bottom unit 118 may emulate, if not the actual sole to be mated with the shoe upper 116, the actual materials, size, shape, contours, etc. of a shoe sole assembly that will be applied to the shoe upper 116 upon assembly of the shoe. Further, it is contemplated that the bottom unit 118 may be formed from a material different from that which is typically used for the sole assembly when the bottom unit is not the intended ultimate sole. For example, a more durable and rigid material may form at least a portion of the bottom unit 118 as the function of the bottom unit 118 is to provide a guide for identifying a bite line in a repeated production process. This is in contrast to a functional purpose of the shoe sole assembly, which is generally provided for impact attenuation, support, and traction, among other reasons. The bottom unit 118 may have any shape or size in an exemplary aspect.

Because the lasted upper 116 and/or corresponding bottom unit 118 may often be formed from pliable and/or compressible materials, the location of an identified bite line on the surface of the lasted upper 116 may vary based upon the amount of force or pressure used to mate the lasted upper 116 with the corresponding bottom unit. The predetermined amount of force applied by the system 120 during the identification of a bite line may be the same force applied when ultimately bonding the lasted upper 116 to the shoe sole assembly represented by the bottom unit 118, but may be different than the force applied during bonding without departing from the scope hereof.

While an exemplary last 140 is depicted in FIG. 3 for illustrative purposes, it is contemplated that alternative lasts may be used in exemplary aspects. For example, turning to FIG. 9, an exemplary last 140 having a toe-portion press member 144 and a dispersion member 146 are depicted, in accordance with aspects hereof. The dispersion member 146 coupled the last 140 and the toe-portion press member 144 such that when a rotational force and/or a compressive force is applied to the dispersion member 146, the force is translated to each of the last 140 and the toe-portion press member 144. In an exemplary aspect it is contemplated that the toe-portion press member 144 is functional to provide a desired compressive force into the toe-portion of the last 140. This toe-portion press member 144 may allow, in an exemplary aspect, a more uniform application of pressure by the last 140 into the bottom unit and or maintainer 122. This application of more equal pressure may result in more consistent bite line detection as a more uniform application of pressure occurs over the entirety of the sole and the toe portion in particular. It is contemplated that the toe-portion press member 144 is optional and may be omitted entirely in exemplary aspects.

Returning to FIG. 3, the last 140 may be removeably secured by a clamping system 148. The clamping system 148 is comprised of a first clamp portion 150 and a second clamp portion 152. The clamping system 148 applies a compressive force on a portion of the last 140 to secure and maintain the last in a desired location. For example, the clamping system 148 may be effective for resisting an upwardly applied compressive force by the bottom unit 118 when in a mated configuration. As such, the lasted upper 116 is minimally changed in the vertical direction as a result of the mating operation applied by the vertical assembly, in an exemplary aspect. Further, the clamping system 148 may be effective for resisting a lateral force applied by one or more components provided herein. It is also contemplated that clamping system 148 is configured to allow for and even supply a rotational motion to the last 116. A rotation may be provided by a rotation drive 154 that is operatively coupled with the clamping system 148. The rotation drive 154 may be a motor or other rotational drive mechanism, in an exemplary aspect. The rotation may be provided at a desired speed to facilitate effective three-dimensional surface information capture around the lasted upper 116 and/or the bottom unit 118. Why a specific arrangement and configuration of a clamping system 148 is provided, it is contemplated that any means may be implemented to achieve aspects provided herein.

The rotation drive 154 and the clamping system 148 are supported in the system 120 by a top support 156. The top support is fixedly coupled with the base support 124, which is effective for resisting translated compressive forces applied by the vertical system on the bottom unit 118 to the lasted upper 116. Similarly, the top support 156 is effective for resisting a rotational change allowing a rotational motion to translate from the rotational drive 154 through the clamping system 148 to the last 116.

The system 120 is further comprised of a scanning assembly/system. The scanning system collects three-dimensional surface data of the lasted upper 116 and the bottom unit 118. While any configuration of components capable of capturing a three-dimensional surface data set (e.g., stereopsis configured components) is contemplated, the following is described with respect to an imaging device 158 and an offset structured light source 160 that together with a computing device are effective for capturing three-dimensional surface information of the lasted upper 116 and the bottom unit 118.

The distance between the structured light source 160 and the imaging device 158 is maintained by a carrier member 162. The illustrated scanning system relies on a structured light pattern projected by the structured light source 160 onto one or more surfaces to be scanned, such as the lasted upper 116 and/or the bottom unit 118. The structured light source 160 may be any suitable light source that provides a defined geometrical representation at a distance from the surface to be scanned. For example, a slit lamp that produces a focused slit-like beam of light from an otherwise unstructured light source may produce the projected light needed to form a structured light reflection on the lasted upper 116. Another light source option includes a structured laser light source. A structured laser light source is a laser that projects a laser light in a structured light pattern, such as a line. This structured line of light may be formed by allowing light in a specific plane to fan outwardly from the source while constraining the dispersion of light in all other directions to result in a plane of light emanating from the structured laser source. When the plane of light contacts a surface, a laser line representation is formed having a focused nature and a controlled width perpendicular to the plane the light forms.

Three-dimensional data is determined based on a deformation of the structured light (e.g., a line) as it is reflected by different features on the scanned surface(s). The deformation from a known structured state is captured by the imaging device in a series of captured images. The computing device having computer readable media with instructions stored thereon for performing a method of identifying three-dimensional data from the series of images containing deformation of the structured light is used to determine a point cloud or other three-dimensional representation of the scanned surfaces. As is known in the art, the captured images having the deformed structure light may be computed to form a point cloud or other three-dimensional surface representation of the scanned surface(s).

In order to capture dimensional data of the bottom unit 118 and/or the lasted upper 116, the combination of articles are rotated in the field of view of the imaging device 158. Additionally and/or alternatively, the scanning system may move in a lateral direction along a slide rail 164. For example, it is contemplated that the carrier member 162 may laterally move along at least a portion of the length of the slide rail 164. As a result, the structured light may project across different portions of the bottom unit 118 and/or the lasted upper 116 by either lateral movement of the vision system and/or rotational movement of the bottom unit 118 and/or the lasted upper 116, in an exemplary aspect. Further yet, it is contemplated that the sensing assembly may be moved in any direction and in combination with or independent of the lasted upper 116 movement to achieve a desired three-dimensional data capture. For example, it is contemplated that a relatively constant distance may be maintained between the lasted upper 116 and the sensing assembly to maintain a desired depth of field for the sensing assembly. This maintained depth may be achieved by configuring the system to linearly move the sensing assembly along a radial line extending from a rotational axis about which the lasted upper 116 rotates. Alternatively, it is contemplated that the sensing assembly is configured to move in an elliptical pattern about the lasted upper, in an exemplary aspect.

While not depicted, it is contemplated that a computing device, such as will be discussed in more detail at FIG. 24, may be operatively connected to one or more components of the system 120 to control or otherwise process information and/or data to achieve aspects provided herein, in an exemplary aspect.

Figure 4:
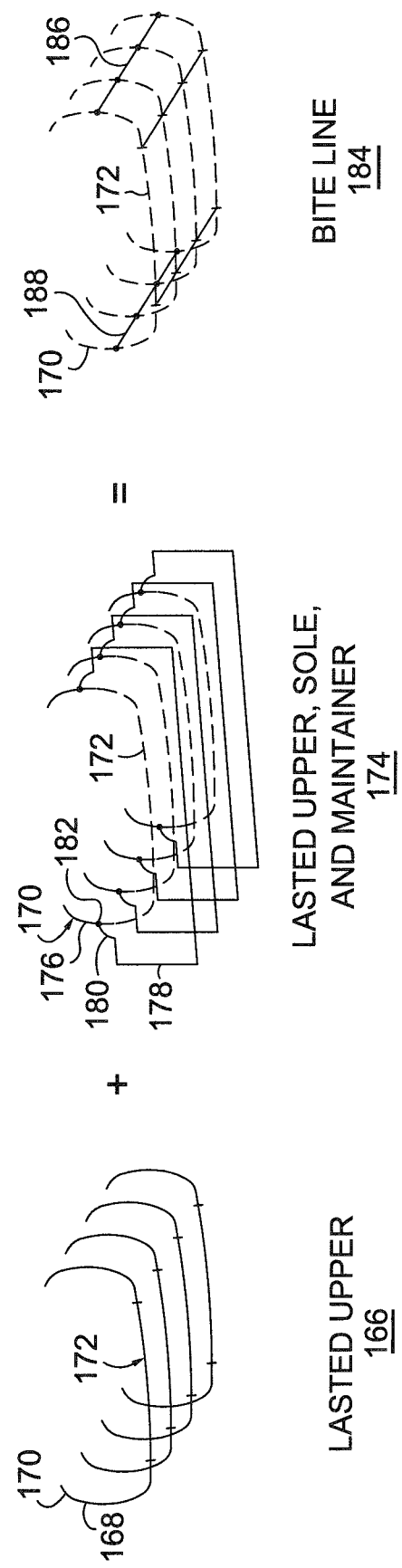
FIG. 4 depicts a simplified illustration of a divergence detection process for determining a bite line from a first three-dimensional data set of a lasted upper in an unmated configuration and a second three-dimensional data set of the lasted upper when mated with a bottom unit, in accordance with exemplary aspects hereof.

FIG. 4 depicts a simplified illustration of the divergence detection process that is contemplated for determining a bite line from a first three-dimensional data set of a lasted upper in an unmated configuration and a second three-dimensional data set of the lasted upper when mated with a sole, in accordance with aspects hereof. A graphical illustration of a first three-dimensional data set 166 representing portions 168 of a lasted upper surface is provided, which may be extracted from a greater point cloud of points representing a surface identified in the three-dimensional data. Each of the portions 168 may include subsets of data representing a surface of the upper, such as a first subset 170 and a second subset 172. In an exemplary aspect, the first subset 170 is data representing a portion of the lasted upper surface that is above the bite line. Stated differently, the first subset 170 is a portion of the lasted upper surface that is not obscured by a sole when mated. While the portions 168 are depicted as linear segments, it is understood that the provided illustration is for illustrative purposes only and in practice may not be illustrated at all, but instead a point cloud maintained as dimensional coordinates internally to a processor and memory of a computing system.

A second three-dimensional data set 174 representing portions 176 of a lasted upper surface is provided. Each of the portions 176 may include subsets of data representing a surface, such as the first subset 170 and a third subset 178. The third subset 178 is data representing a portion of the maintainer as scanned. A fourth subset 180 is data representing a portion of the bottom unit as scanned. The second subset 172 is depicted in dashed lines for contextual purposes only in the second three-dimensional data set 174 as the surface represented by the second subset 172 may be obscured during a scanning process. It is contemplated that data in the second three-dimensional data set 174 may not define the second subset 172 as the surfaces represented by the second subset 172 may be obscured from the scanning system, in an exemplary aspect. At a point of intersection between the first subset 170 and the fourth subset 180, a point 182 is formed.

The point 182 represents a point useable for defining a bite line on the lasted upper. However, to determine where the point 182 is on the lasted upper, a comparison between the first three-dimensional data set 166 and the second three-dimensional data set 174 is performed to identify which portions of the second three-dimensional data set 174 represent the mated bottom unit and which portions represent the lasted upper. For example, the first three-dimensional data set 166 and the second three-dimensional data set 174, when aligned and registered together, may be analyzed to determine a convergence of the second subset 172 and the fourth subset 180 to the first subset 170. At a point of convergence (or alternatively a divergence), a bite line point may be determined, such as at the point 182. While convergence is discussed, it is also contemplated that a divergences or other comparison technique is implemented to deduce the portion of the three-dimensional data that represents the sole and which portion represents the lasted upper portion.

An example of the determination of a bite line may include comparing the data points forming the first three-dimensional data set 166 and the second three-dimensional data set 174 such that when data points of the first three-dimensional data set 166 and the second three-dimensional data set 174 diverge from one another, such as at a point 182, a change in the surface is determined at this point, which represents a transition from the lasted upper surface to the sole surface. This transition, in an exemplary aspect, defines the bite line location. A tolerance may be implemented to allow for variability in the three-dimensional data sets such that only when overlaid data points diverge from one another a specified amount (e.g., 0.01 mm-0.5 mm), is a determination made that a surface divergence is represented.

Based on the analysis of the first three-dimensional data set 166 and the second three-dimensional data set 174, a digital bite line data set 184 may be determined, as depicted by lines 186, 188. The first subset 170 and the second subset 172 are depicted in dashed lines to merely provide contextual information for purposes of illustrating the digital bite lines 186, 188, in this exemplary aspect. The bite lines 186, 188 may be interpolated from a connection among the series of points 182 from the represented portions 168 and 176. Stated differently, the bite lines may be determined based on determining a point of difference between the first three-dimensional data set 166 and the second three-dimensional data set 174 and then those determined points may be used with interpolation techniques to identify a location of the bite line relative to the lasted upper as captured by the data. As provided above, it is contemplated that a divergence from the first subset 170 to the second subset 172 and the fourth subset 180 at the point 182 identifies, by analysis, the location of the point 182 and a related bite line portion.

Figure 5:
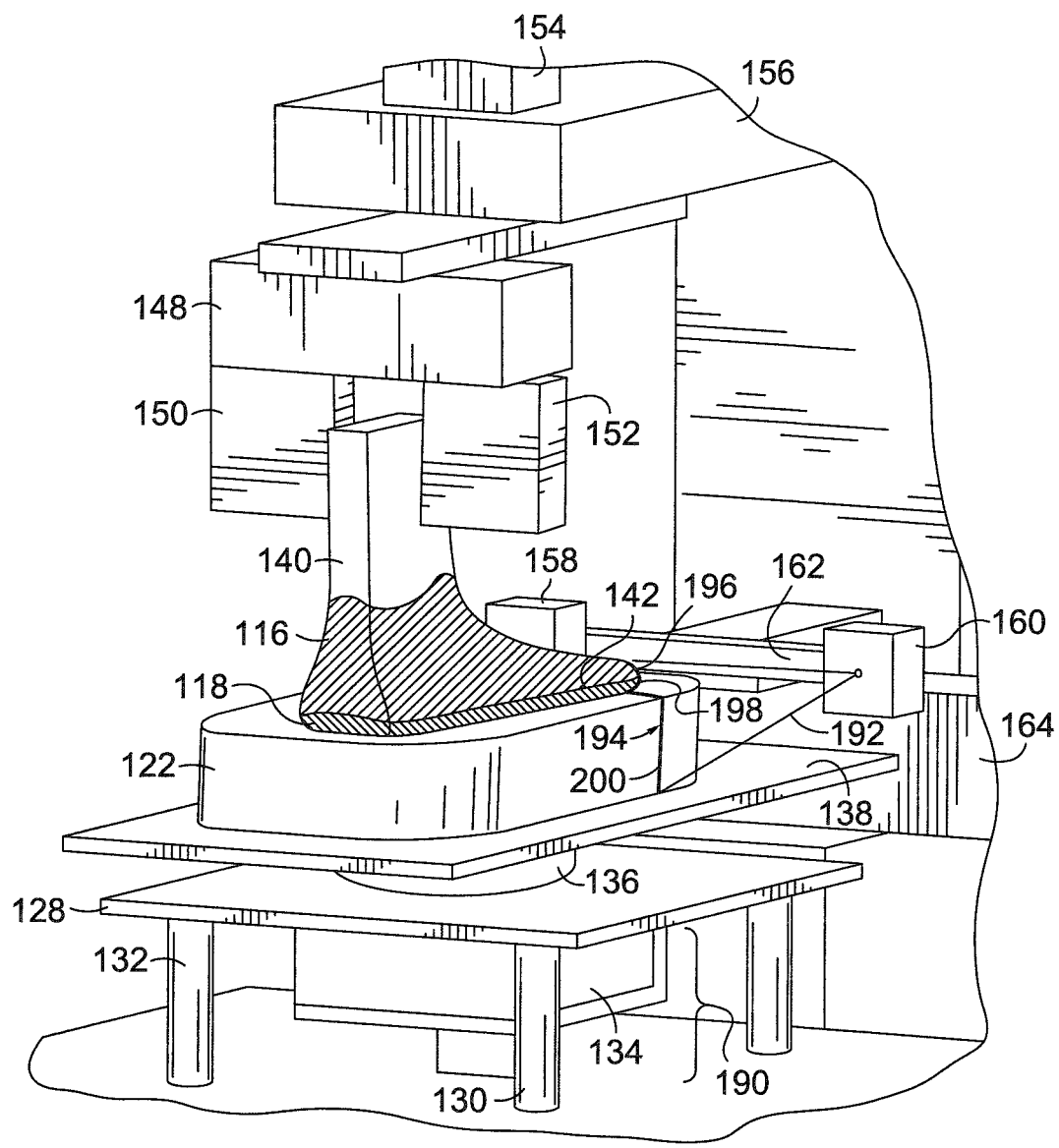
FIG. 5 depicts a focused view of the system from FIG. 3 with the lasted upper in a mated configuration with the bottom unit, in accordance with exemplary aspects hereof.

FIG. 5 depicts a focused view of the system 120 from FIG. 3 with the lasted upper 116 in a mated configuration with the bottom unit 118 as supported by the maintainer 122, in accordance with aspects hereof. As previously discussed, the lasted upper 116 may be placed in a mated or joined configuration with the bottom unit 118 through a vertical movement of a vertical system actuated by the vertical actuator 134. As a result of this vertical positioning, the support plate 128 extends a height 190 above the top surface 126. As will be discussed in FIG. 6 hereafter, the height between the support plate or alternative components (e.g., the bottom unit 118) is reduced when the lasted upper 116 and the bottom unit 118 are in an unmated configuration, in an exemplary aspect.

The light source 160 is depicted projecting a beam of light 192 that intersects with the lasted upper 116 and the bottom unit 118 forming a structured light reflection 194. The structured light reflection may contain multiple subsets, such as a first subset 196 representing the structured light reflected from the lasted upper 116, a second subset 198 that represents the light reflected from the bottom unit 118, and a third subset 200 that represents the light reflected from the maintainer 122, in an exemplary aspect. For discussion purposes and illustrative purposes, it is suggested that the first subset 196, the second subset 198, and the third subset 200 may result in the data identified as the first subset 170, the third subset 178, and the fourth subset 180 of FIG. 4, respectively.

It is contemplated that the imaging device 158 is configured to capture the structured light reflection 194 for use in determining a three-dimensional data set representing the surfaces from which the structured light reflects. Additionally, as previously discussed, it is contemplated that the lasted upper 116 and the mated bottom unit 118 are rotated within the field of view of the imaging device 158 to capture images of the structured light reflection 194 across different portions of the lasted upper 116 and the bottom unit 118 to form a volumetric representation representing the combination of elements as scanned. Further, it is contemplated that the scanning system may laterally move to capture one or more portions of the lasted upper 116 and the bottom unit 118 surfaces.

Figure 6:
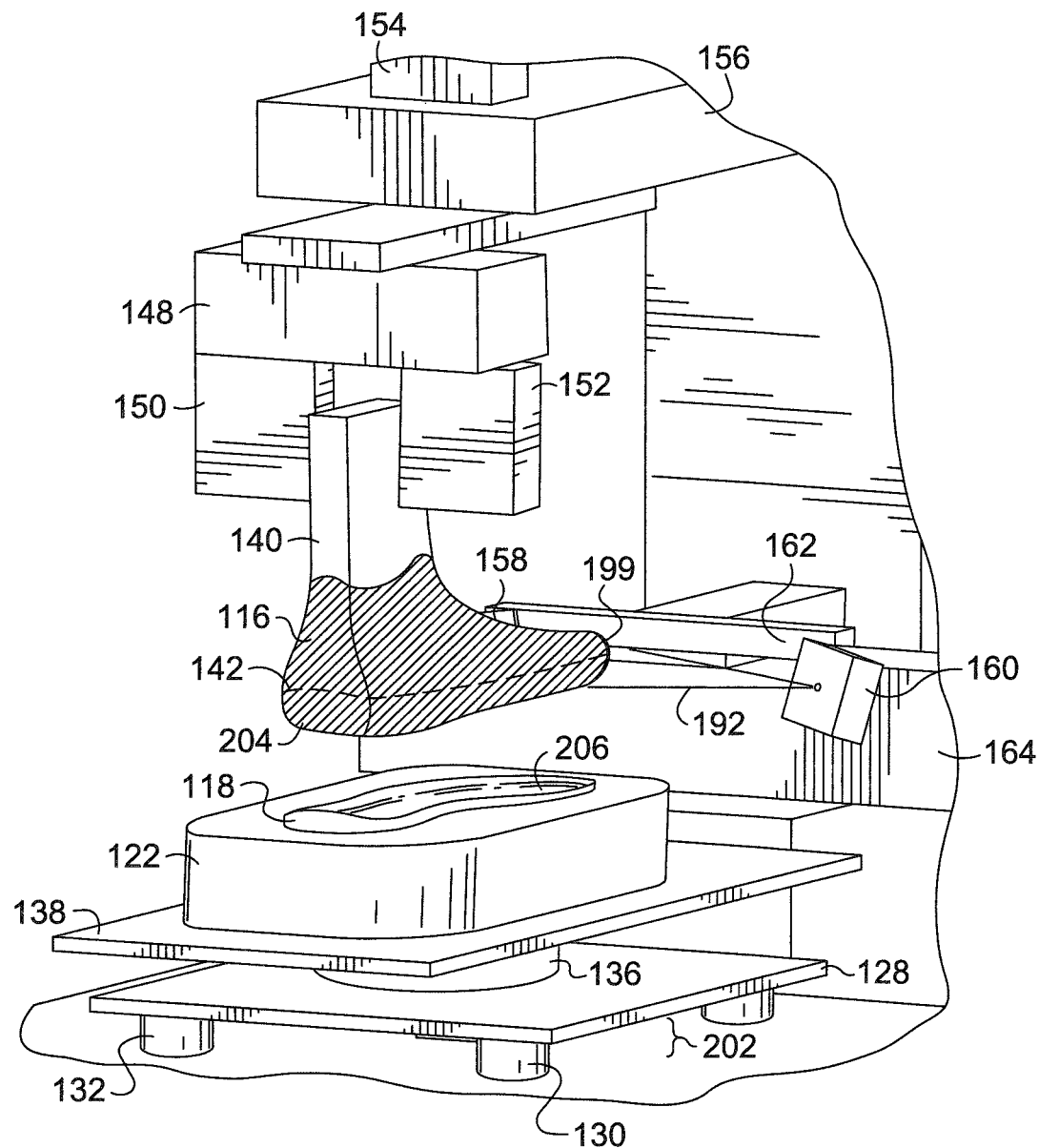
FIG. 6 depicts a focused view of the system from FIG. 3 with the lasted upper in an unmated configuration with the bottom unit, in accordance with exemplary aspects hereof.

FIG. 6 depicts a focused view of the system 120 from FIG. 3 with the lasted upper 116 in an exemplary unmated configuration with the bottom unit 118, in accordance with aspects hereof. As depicted, the bottom unit 118 as maintained by the maintainer 122 is lowered relative to the lasted upper 116 such that a height 202 between the top surface 126 and the support plate 128 is reduced from the height 190 of previously discussed FIG. 5. It is contemplated that a bite line may be determined with a second data set having a height 202 that is less than the height 190. In the particular example of FIG. 6, the bottom unit 118 is lowered to expose a complete bottom portion 204 of the lasted upper 116. However, as suggested above, the system may also determine a bite line even when a portion of the bottom portion 204 is not exposed from the bottom unit 118. The bottom portion 204 may be defined as any portion that is obscured by the bottom unit 118 when in a mated configuration. As such, a bite line intersection 142 is illustrated in FIG. 6 for illustrative purposes as the bottom portion 204 is the portion that extends below the mated configuration intersection of the lasted upper 116 and the bottom unit 118 which also coincides by design with the bite line location.

The scanning system is depicted as the structured light source 160 projecting the beam of light 192, which generates a light reflection line 199 reflecting from the lasted upper 116. As previously discussed, the imaging device 158 is configured to capture the light reflection line 199 as the light reflection line 199 reflects from the lasted upper 116 surface(s). The lasted upper 116 may be rotated within the field of view of the imaging device 158 to facilitate capturing the light reflection line 199 at different locations on the lasted upper 116. In this example when the height 202 is a value allowing the lasted upper to completely clear from a cavity 206 configured to receive the lasted upper 116, the rotation of the lasted upper 116 does not also cause the rotation of the sole or other components of the vertical system. As also previously provided, the scanning system may laterally move to facilitate the scanning of various portions on the lasted upper 116, in an exemplary aspect.

Figure 7:
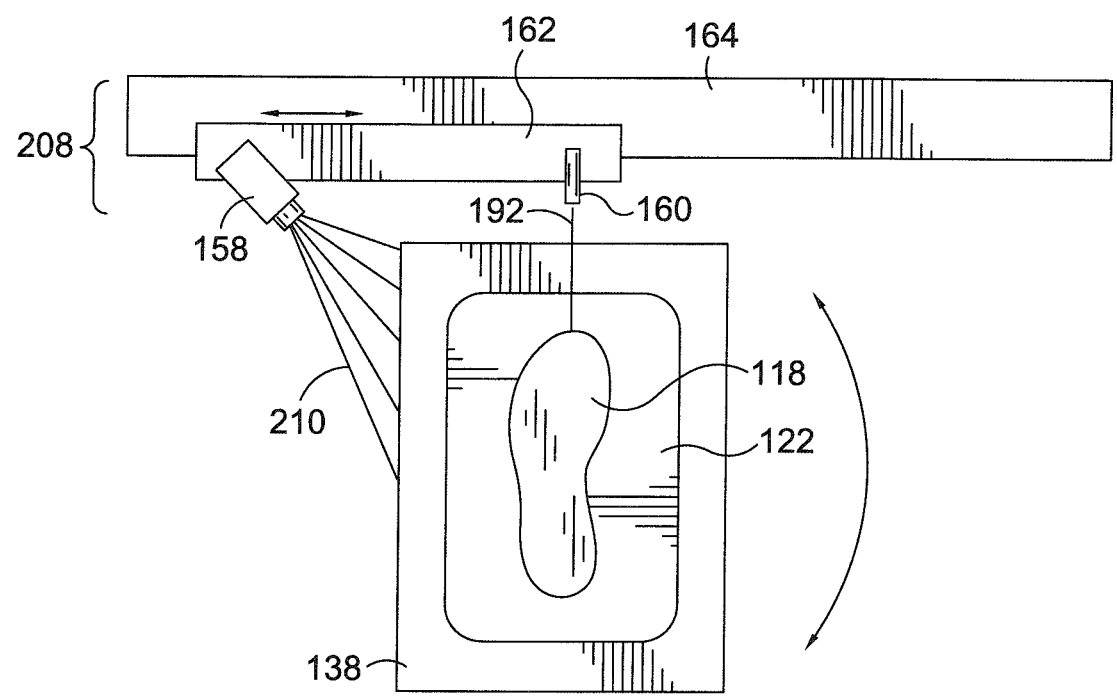
FIG. 7 depicts a top plan view of the rotational plate, maintainer, and the bottom unit in relation to an exemplary scanning system, in accordance with exemplary aspects hereof.

FIG. 7 depicts a top plan view of the rotational plate 138, maintainer 122, and the bottom unit 118 in relation to an exemplary scanning system 208, in accordance with aspects hereof. As previously discussed, a scanning system may be comprised of an imaging device 158 and a structured light source 160 maintained in a relative position by a coupling member 162. The coupling member may allow for lateral movement on a slide rail 164 such that various perspectives of the bottom unit and/or a lasted unit may be captured by the scanning system 208. A lateral arrow is depicted on the slide rail 164 representing a potential direction of travel. Further, it is contemplated that the rotational plate may rotate to provide or allow a multi-surface scan. The general direction of rotation is depicted by a curved arrow in FIG. 7. While a specific shape and size of the maintainer 122 is depicted herein, it is contemplated that any size and shape of the maintainer 122 may be implemented such that an intersection between the lasted upper 116 and the bottom unit 118 when in a mated configuration occurs at a location of a desired bite line. Therefore, it is contemplated that any size or shape of the maintainer 122 may be used or omitted entirely in aspects hereof.

The imaging device, such as a charge-coupled device (CCD) or other camera, is effective for capturing a reflected structured light from one or more surfaces, such as from a sole and/or a lasted upper. The imaging device has a field of view, such as a field of view 210 that defines a field that is able to be captured by the imaging device. The structured light source is also configured to output a structured light beam, such as a light beam 192 that is effective to form a vertical line as a reflection on one or more surfaces, such as a sole and/or a lasted upper.

Figure 8:
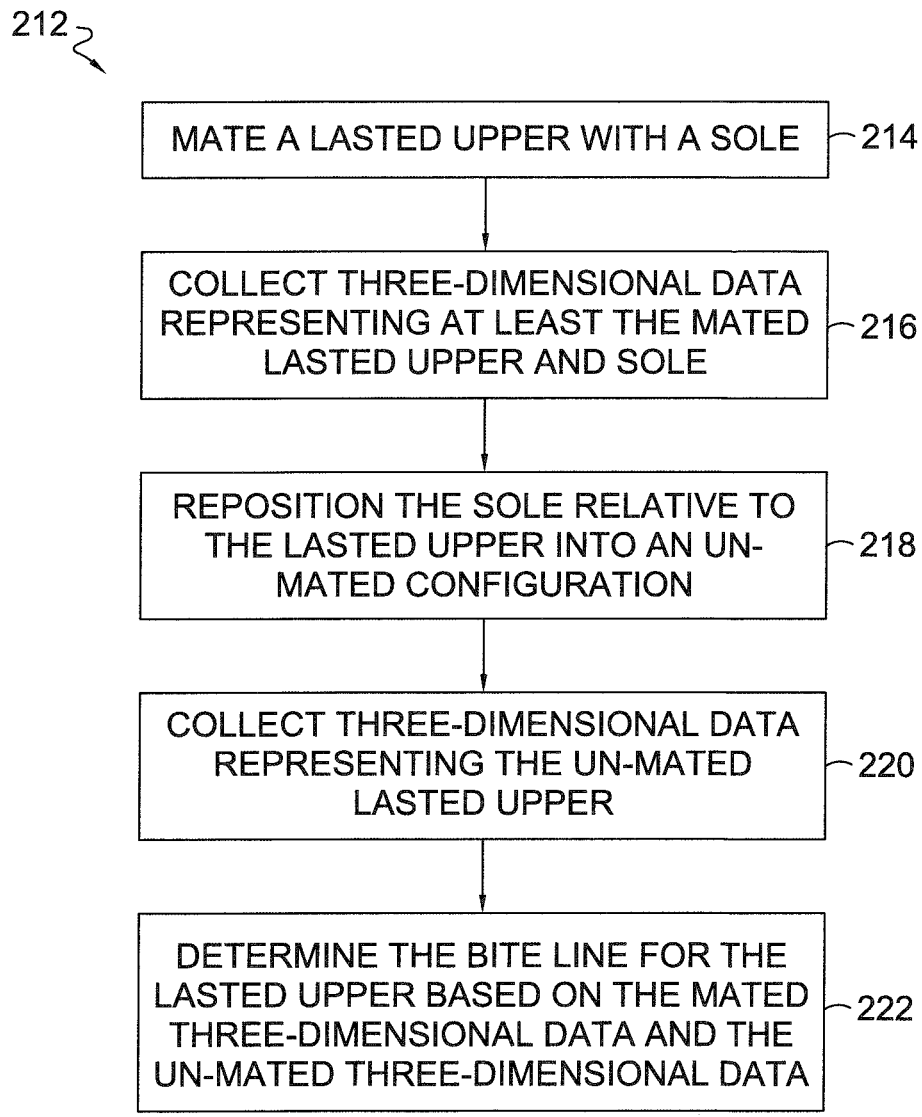
FIG. 8 depicts a flow diagram representing a method for determining a bite line on a lasted shoe upper, in accordance with exemplary aspects hereof.
Figure 9:
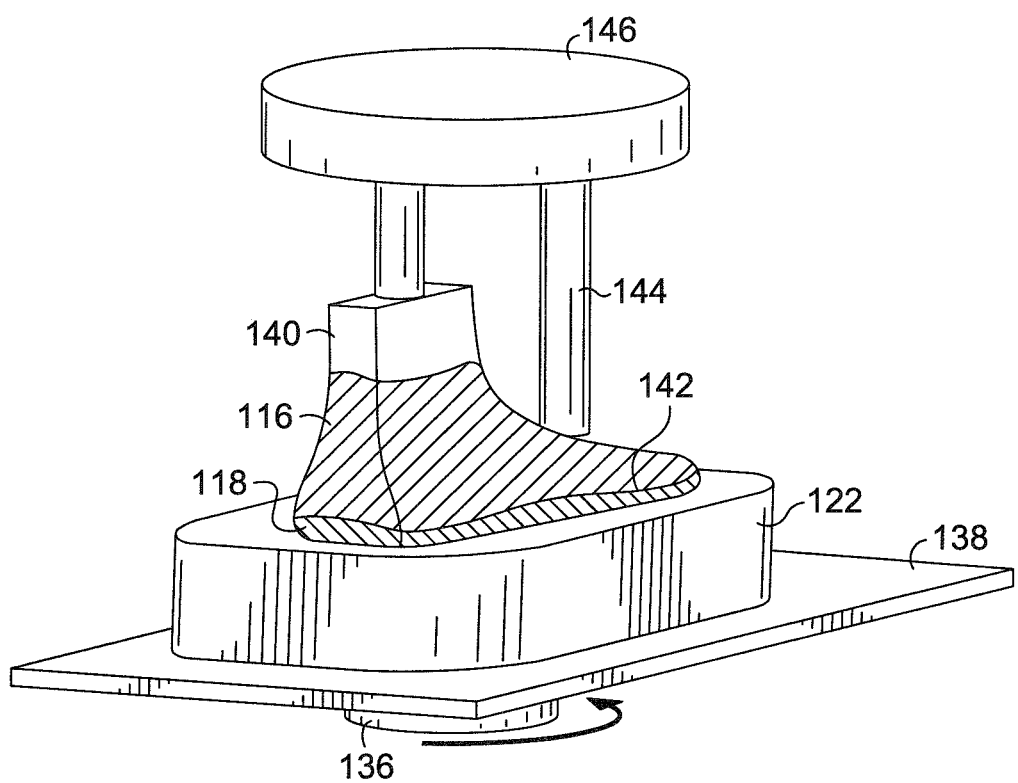
FIG. 9 depicts an exemplary last having a toe-portion press, in accordance with exemplary aspects hereof.

FIG. 8 depicts a flow diagram representing a method 212 for determining a bite line on a lasted shoe upper, in accordance with aspects hereof. It is contemplated that while a specific order of steps is presented and discussed that alternative ordering may be implemented without departing from the scope of the aspects provided herein. At a first block 214 a step represents mating a lasted upper with a sole. As provided above, the mating of the lasted upper and the sole may include moving at least one of the lasted upper or the sole into a desired relationship such that an intersection created edge between the sole and the lasted upper defines a desired bite line. In an exemplary aspect, the sole is formed with a receiving cavity configured to receive a portion of the lasted upper. In an exemplary aspect, the portion of the lasted upper that the sole is configured to receive is a portion of the lasted upper that is to be covered by a sole assembly upon formation of the resulting shoe. Stated differently, the sole is configured with a receiving portion configured to receive a portion of the lasted upper that is intended to be covered by a shoe sole assembly at the completion of the shoe construction.

At a block 216, a step is depicted as including the collecting three-dimensional data representing the mated lasted upper and at least the sole. As also depicted in FIG. 5 hereinabove, three-dimensional data representing the mated lasted upper and at least the sole may include data representing the lasted upper, the sole, and the maintainer, in an exemplary aspect. It is contemplated that the collection of the three-dimensional data may be accomplished by a variety of means, such as a multi-camera stereopsis arrangement. Additionally, and as discussed herein, it is contemplated that the three-dimensional data may be captured through the use of a structured light reflected from the surface to be scanned with an imaging device (e.g., a sensing device) capturing the structured light reflection. Additional sensing devices contemplated include, but are not limited to CCD, cameras, sonography, photometric, time-of-flight, and other known three-dimensional scanning techniques. The data may be collected by rotating the mated lasted upper and the sole in a field of view of a fixed scanning system. Alternatively, it is contemplated that the scanning system may rotate or move around a stationary mated lasted upper and sole. Further, it is contemplated that the mated lasted upper and sole may be rotated a desired degree to expose a particular portion of a surface and then the scanning system may move, such as in a linear path, to capture a portion of the exposed surface. Other combinations or techniques are contemplated for capturing a multi-sided scan of the mated lasted upper and sole such that the bite line can be determined around the periphery of the combination of elements.

At a block 218, a step is depicted for repositioning the sole relative to the lasted upper into an unmated configuration. The repositioning may include moving the sole away from the lasted upper, moving the lasted upper away from the sole, or moving both the lasted upper and the sole away from a mated configuration. An unmated configuration is an arrangement of the lasted upper and the sole such that a lesser portion (if any) of the lasted upper is obscured from the scanning device field of view. For example, when the lasted upper is maintained in a consistent vertical position while the sole is lowered away from the lasted upper, a greater portion of the lasted upper is exposed to the scanning system such that three-dimensional data in the unmated configuration provides a different surface definition than the three-dimensional data in the mated configuration. It is this difference in the surface definitions provided by the data that is useable to deduce the location of a bite line, which is represented by the intersection of the lasted upper and a top edge of the sole, in an exemplary aspect.

At a block 220, a step of collecting three-dimensional data representing the unmated lasted upper is provided. As discussed with respect to block 218, various scanning systems are contemplated. For example, a structured light source in combination with a sensing device, such as a CCD, may be maintained in a static position relative to the scanned articles and/or the scanning system may be moved, such as linearly, circularly, or elliptically, in an exemplary aspect.

At a block 222 a step of determining the bite line for the lasted upper based on the mated three-dimensional data and the unmated three-dimensional data is provided. As provided herein, it is contemplated that a number of techniques may be used to determine a bite line location based on the two data sets. For example, the mated three-dimensional data may be registered with the unmated three-dimensional data, such as a aligning a portion of the lasted upper that is common to both data sets. After registering the data, a divergence in the two data sets may identify a discrepancy caused by a repositioning of the sole relative to the lasted upper. A computing system may analyze the data sets with additional information that an edge formed in the mated three-dimensional data set at the intersection of the lasted upper and the sole that is different in the unmated three-dimensional data set represents a bite line location. Stated differently, a computing device may determine where an edge formed by the intersection of the lasted upper and the sole when mated represents the bite line. As previously provided, it is contemplated that alternative ordering may occur of one or more steps provided in method 212. For example, steps represented by blocks 218 and 220 may occur prior to steps represented by blocks 214 and 216, in an exemplary aspect.

Although one system and method for creating a digital bite line is described above, it is contemplated that many other systems and methods could be used to create a digital bite line. As example and in no way limiting, these methods could include utilizing a stylus connected to an articulated arm and in electronic communication with a computing device. The stylus is articulated along the intersection between a mated bottom unit and a lasted upper so that a data set registering XYZ coordinates and representing a digital bite line is input into the computing device. The stylus can be articulated around the shoe manually or automatically. Such a system is disclosed in U.S. Pat. No. 8,966,775 which is hereby incorporated herein by reference.

Another example system and method of generating a digital bite line involves performing a three dimensional scan of a mated bottom unit and lasted upper and looking for inflections or changes in the data to determine a digital bite line. Such a system is disclosed in U.S. Publication No. 2014/0362079 (U.S. application Ser. No. 14/468,521) which is hereby incorporated herein by reference.

A still further example system and method of generating a digital bite line involves generating a digital bit line from a physical bite line drawn on a lasted shoe upper. This system involve a three dimensional scan of the lasted shoe upper to detect the physically drawn bite line and creating via a computing device a data set representing the digital bite line. The physically drawn bite line can be manually drawn initially on a model or pattern of a shoe upper. In such a system the digital bite line generated from the model is used for all the following manufactured lasted uppers. Thus, the physical bite line is only manually drawn once to create the digital bite line data to be used later. Such a system is disclosed in U.S. Pat. No. 9,237,780 which is hereby incorporated herein by reference.

Figure 10:
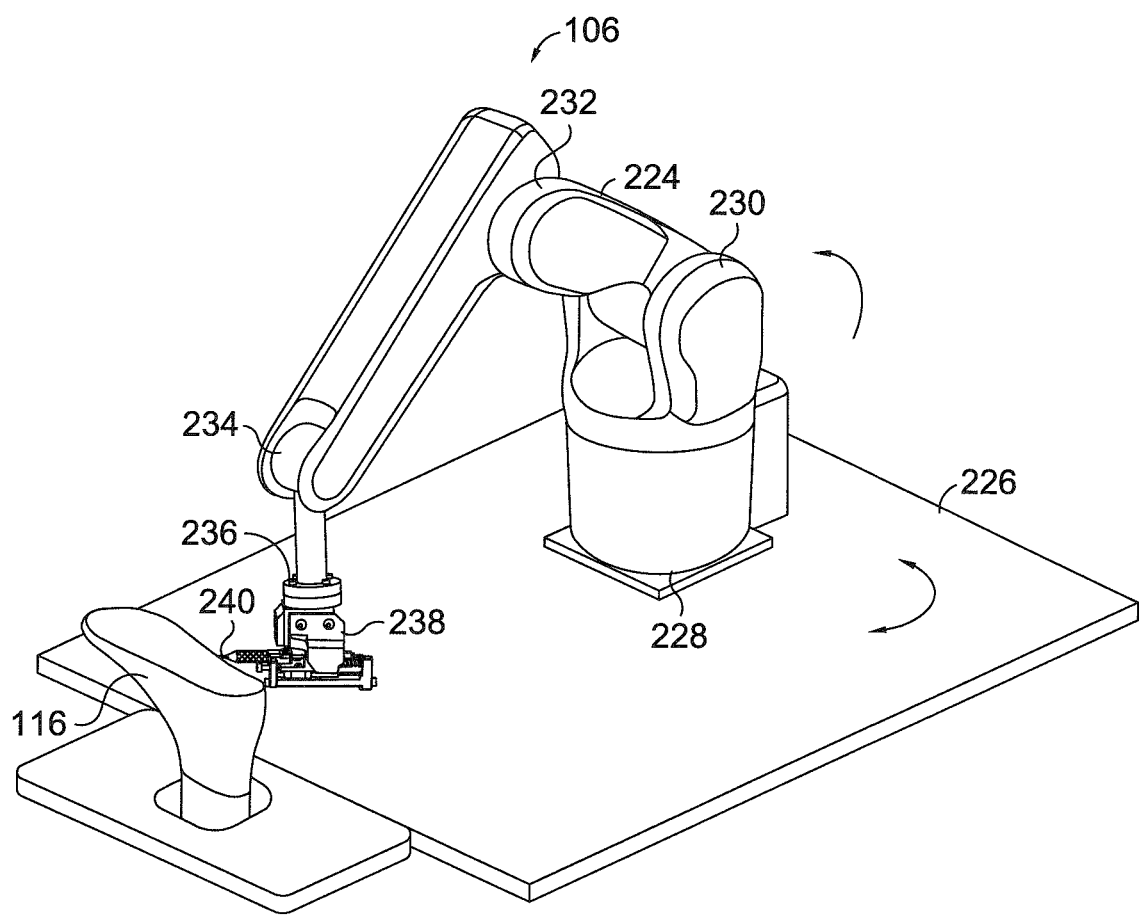
FIG. 10 depicts an exemplary system for automatically gauge marking a bite line, in accordance with exemplary aspects hereof.

Referring to FIGS. 10-17, the automatic gauge marking system and method 106 will be described. FIG. 10 depicts a robotic arm 224 that is capable of being articulated around a shoe upper 116 position on a last 140. The robotic arm is mounted to a base 226 and has articulating and/or rotational joints 228, 230, 232, and 234. The robotic arm includes a distal end 236 onto which a marking instrument 238 is removably attached. The marking instrument 238 is used to perform the actual physical marking of the shoe upper 116 and has a marking tip 240 for accomplishing the marking.

The marking instrument includes a base 242 that is removably mounted to the distal end 236 of the arm 224 utilizing for example bolts or screws 244. Referring to FIGS. 12 and 13, one particular marking instrument 238 is depicted. This instrument is used to hold a permanent marking pen 246, such as a silver pen. The pen 246 is used to physically draw the bite line 248 on the shoe upper 116. By permanent it is meant that the pen 246 uses a form of ink that needs to be physically removed after the bottom unit 118 and the shoe upper 116 are permanently secured together by adhesive or cement or that the bite line 248 is marked in such a way that it will be covered by the bottom unit 118. It is the pen 246 that has the marking tip 240 positioned thereon.

A pen holding carriage 250 is slidably mounted to the base 242 to provide flexibility when the robotic arm does the drawing and ensure that contact between the marking tip 240 and the surface of the shoe upper 116 is maintained. More specifically, the base 242 includes an elongated frame 252 having a forward abutment member 254 on one end and a rearward abutment member 256 on the other end. The forward abutment member 254 is the portion of base 242 that is closest to the shoe upper 116 during the drawing operation. Positioned on and attached to the frame 252 is a male slide rail 258. The rail 258 is also positioned in between the forward abutment member 254 and the rearward abutment member 256. The male rail 258 is slidably coupled to a female slide connector 260. Thus, the female slide connector 260 is operably coupled to the male slide rail 258 in such a way so that the connector 260 can slide along the rail 258 but still be secured thereto. This is accomplished by the connector 260 having a female groove 261 formed therein that has a cross section that fits the cross section shape of elongated male protrusions 259 from rail 258 as depicted in FIG. 14. The connector 260 is fixedly connect to the carriage 250 so that as the connector 260 slidably moves with respect to the rail 258, so does the carriage 250 slidably move with respect to the base 242. This sliding action allows for adjustment of the marking tip 240 to ensure that the tip stays in contact with the shoe upper 116 during the automatic drawing operation. The carriage 250 also includes a forward mounting bracket 266 and a rear mounting bracket 268 to removably secure the pen 246 to the carriage 250.

The carriage 250 further includes a biasing structure 270 for biasing the marking tip 240 towards the shoe upper 116 to ensure engagement of the tip with the upper. The carriage 250 includes an elongated rod 272 fixedly mounted to the carriage 250 via an upstanding flange 274. The rod 272 extends rearwardly towards the rearward abutment member 256 of the base 242. The rearward abutment member 256 has an aperture 276 formed therein to receive the rod 272 and allow it to pass therethrough. The biasing structure 270 further includes a spring 278 positioned between the upstanding flange 274 of the carriage 250 and the rearward abutment member 256 of the base 242. A first end 280 of the spring 278 abuts against the upstanding flange 274 and a second end 282 of the spring 278 abuts against the rearward abutment member 256 of the base 242. The spring 278 is positioned around the rod 272. Referring to FIGS. 15 and 16, the operation of the carriage 250 and the biasing structure 270 will be described. It is to be noted that in FIGS. 15 and 16, a slightly different type of marking instrument 238 is depicted. This marking instrument 238 is adapted to hold an autovanishing ink pen 284. A vanishing ink pen 284 contains an ink that temporarily shows up on the shoe upper 116 after marking, but disappears after a certain amount of time such that the ink will not be visible to the naked eye on a final shoe product. The marking instrument shown in FIGS. 15 and 16 differs from the instrument in FIGS. 12-14 only in that it has different mounting brackets 286 and 288 that are specific to the pen 284 and are used to mount the pen 284 to the carriage 250. Like the permanent pen 246, the auto vanishing 284 has a marking tip 240. As the marking instrument 238 is articulated around the shoe upper 116, it is important that the marking tip 240 maintains sufficient contact and force on the shoe upper 116 to perfect a physical marking. The spring 278 biases the carriage 250 forwardly towards the shoe upper 116 because the spring 278 is compressed during assembly of the marking instrument 238. The forwardmost position of the carriage 250 and thus the forwardmost positon of the pen 284 is set and adjustable by a set screw 290 that is threadably received in an aperture (not shown) formed in the forward abutment member 254. A distal end 292 of the screw 290 engages a forward abutment surface 294 of the carriage 250 to vary the forwardmost position of the pen 284. As the marking instrument 238 is articulated around the shoe upper 116, depending upon the location of the robotic arm 224, the carriage 250 may slidably move with respect to the base 242 due to pressure exerted on the marking tip 240 by the surface of the shoe upper 116. This sliding motion can vary as the marking instrument 238 moves around the shoe upper 116, thus resulting in varying compression of the spring as can be seen in FIG. 16. The compression of the spring 278 and thus the exertion of a biasing force on the marking tip 240 is accomplished as the distance between the upstanding flange 274 and the rearward abutment member 256 decreases due to the sliding motion between the carriage 250 and the base 242. As this happens, the rod 272 further slides within the aperture 276 (shown in phantom in FIGS. 13 and 16). This sliding arrangement allows for a consistent and effective marking of the bite line 248 by the automatic gauge marking system 106.

Figure 11:
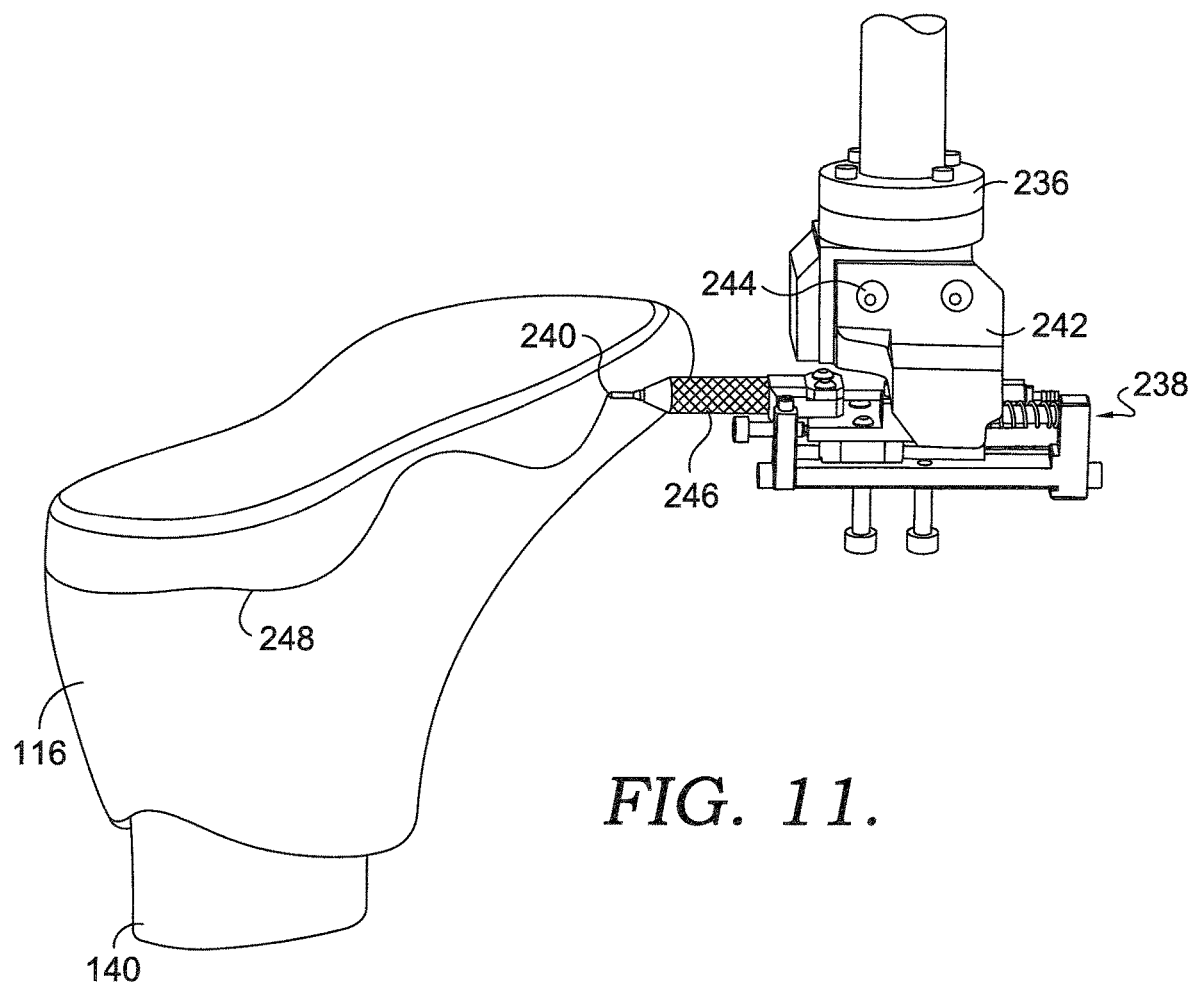
FIG. 11 depicts a focused view of the system of FIG. 10, in accordance with exemplary aspects hereof.
Figure 17:
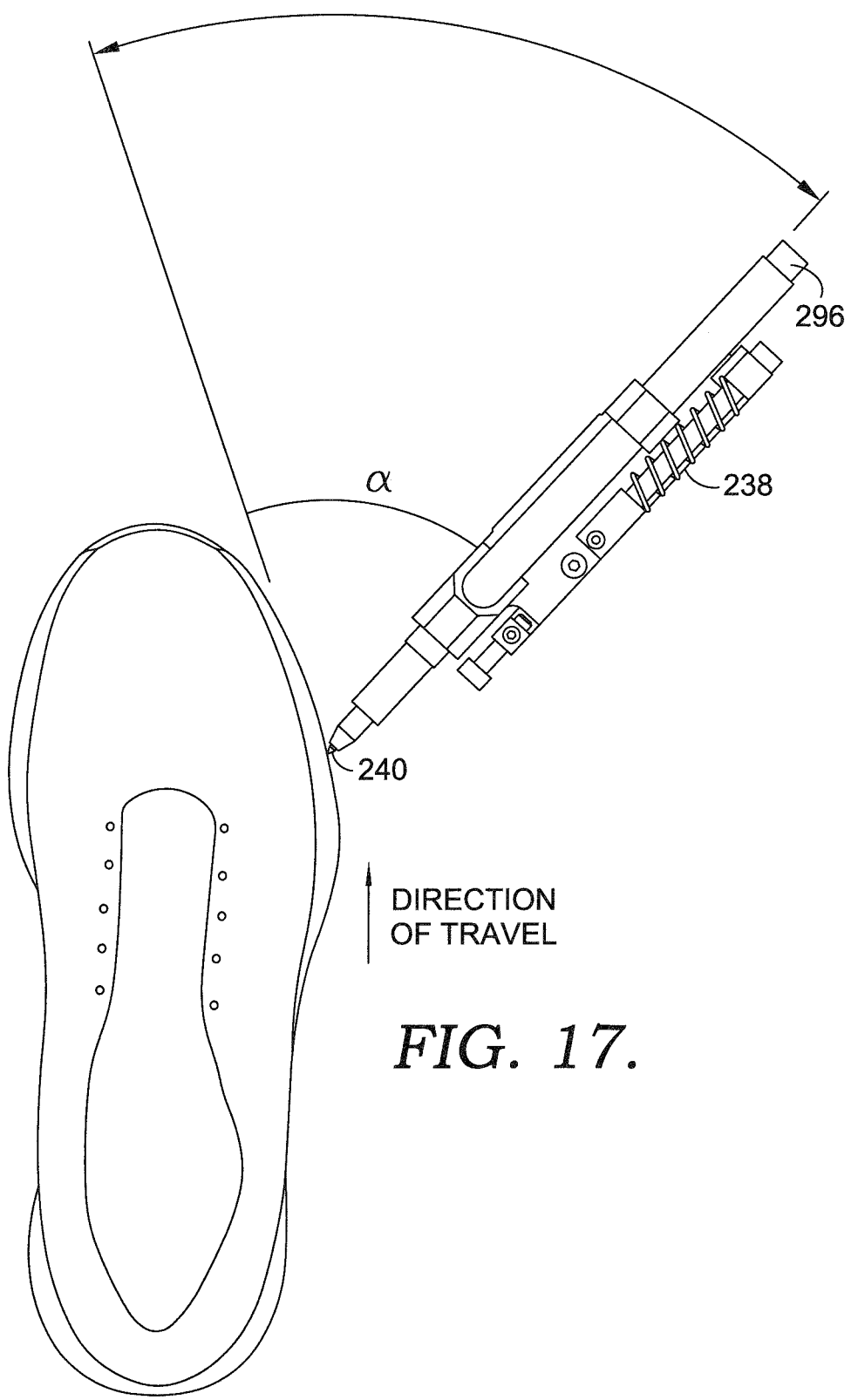
FIG. 17 depicts a diagrammatic view of the automatic gauge marking system, in accordance with exemplary aspects hereof.
Figure 18:
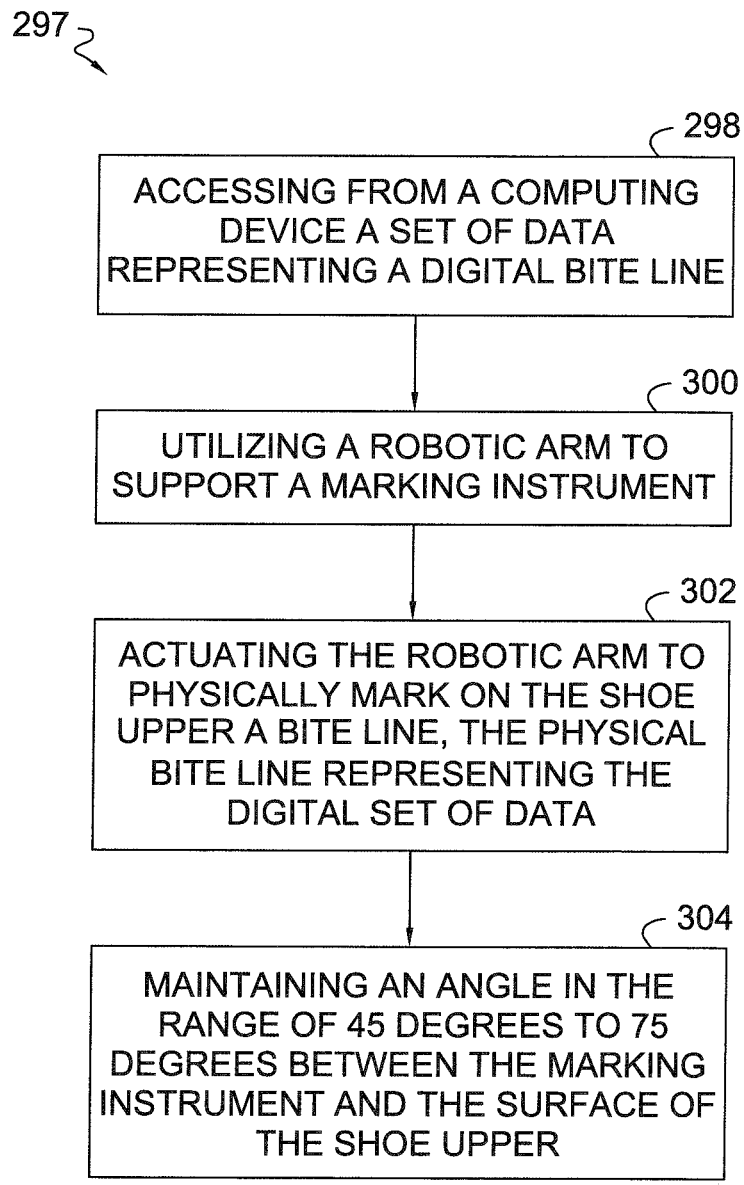
FIG. 18 depicts a flow diagram representing a method for automatically drawing a bite line on a lasted shoe upper, in accordance with exemplary aspects hereof.

Referring to FIGS. 11, 17 and 18, a method and system of automatic gauge marking of a bite line 248 is described. More specially, it was found, through experimentation with a variety of different shoe upper materials, to be desirous to angle marking instrument 238 in the direction of travel around the shoe upper 116 such that a non-operating end 296 of either the permanent pen 246 or the auto vanishing pen 284 moves first around the shoe upper 116. This operation is specifically shown in FIG. 17 and mimics the tilt of a pen during a typical writing motion as it moves across a sheet of paper. Experimental testing was done with both the permanent pen 246 and the auto vanishing pen 284 on a variety of shoe upper materials for instance, leather, synthetic leather and mesh. It was found to be desirous to have the angle $\alpha$ in the range of 45 degrees to 75 degrees. It was found to be even more desirous to have the angle $\alpha$ in the range of 55 degrees to 65 degrees. It was found most desirous to have the angle $\alpha$ be at 60 degrees. These ranges apply to both the permanent pen 246 and the auto vanish pen 284. It was also found to be desirous to have the marking tip 240 of both pens 246 and 284 be approximately 2 millimeters in length. The angle $\alpha$ ensured a clean physical marking on the shoe upper without damaging the pens 246, 284.

FIG. 18 depicts a method 297 of automatically marking a bite line on a shoe upper. The block 298 represents the step of accessing from a computing device a set of data representing a digital bite line. The block 300 represents the step of utilizing a robotic arm to support a marking instrument. The block 302 represents the step of actuating the robotic arm to physically mark on the shoe upper a bite line, the physical bite line representing the digital set of data. The block 304 represents the step of maintaining an angle in the range of 45 degrees to 75 degrees between the marking instrument and the surface of the shoe upper. Additional steps can include maintaining the angle of engagement between the marking instrument and the shoe upper in the range of 55 degrees to 65 degrees and maintaining the angle of engagement between the marking instrument and the shoe upper at 60 degrees.

Figure 19:
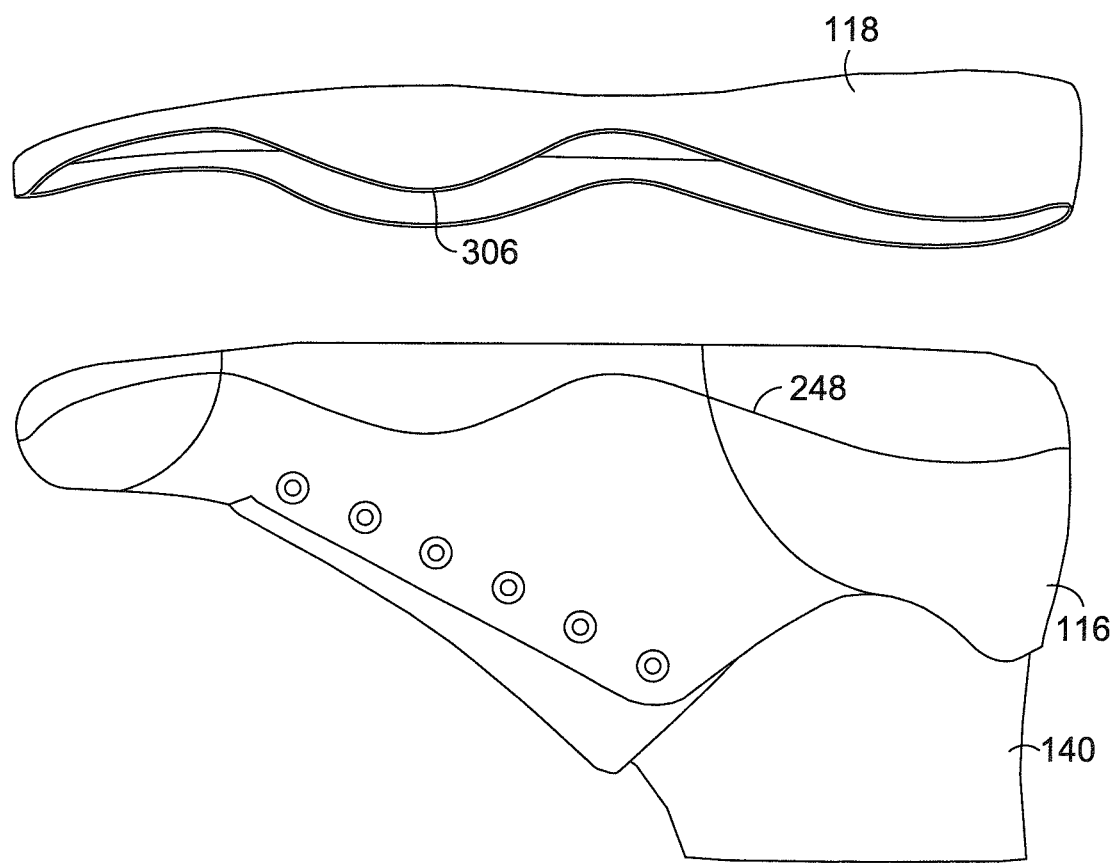
FIG. 19 depicts diagrammatic view of a lasted shoe upper with a physical bite line drawn thereon by the automatic gauge marking system, in accordance with exemplary aspects hereof.

FIG. 19 depicts a shoe upper 116 on a last 140 after the automatic gauge marking step 106 with a physical bite line 248 drawn on the upper. A bottom unit 118 is shown in the FIG. 19 to give perspective and show how the bite line 248 reflects the profile of the edge 306 of the bottom unit 118. The bite line 248 represents the digital bite line data set 184 determined by the automatic bite line determining system and method 102 and described herein and then physically drawn by the automatic gauge marking system and method 106 using the digital bite line data set 184.

Figure 20:
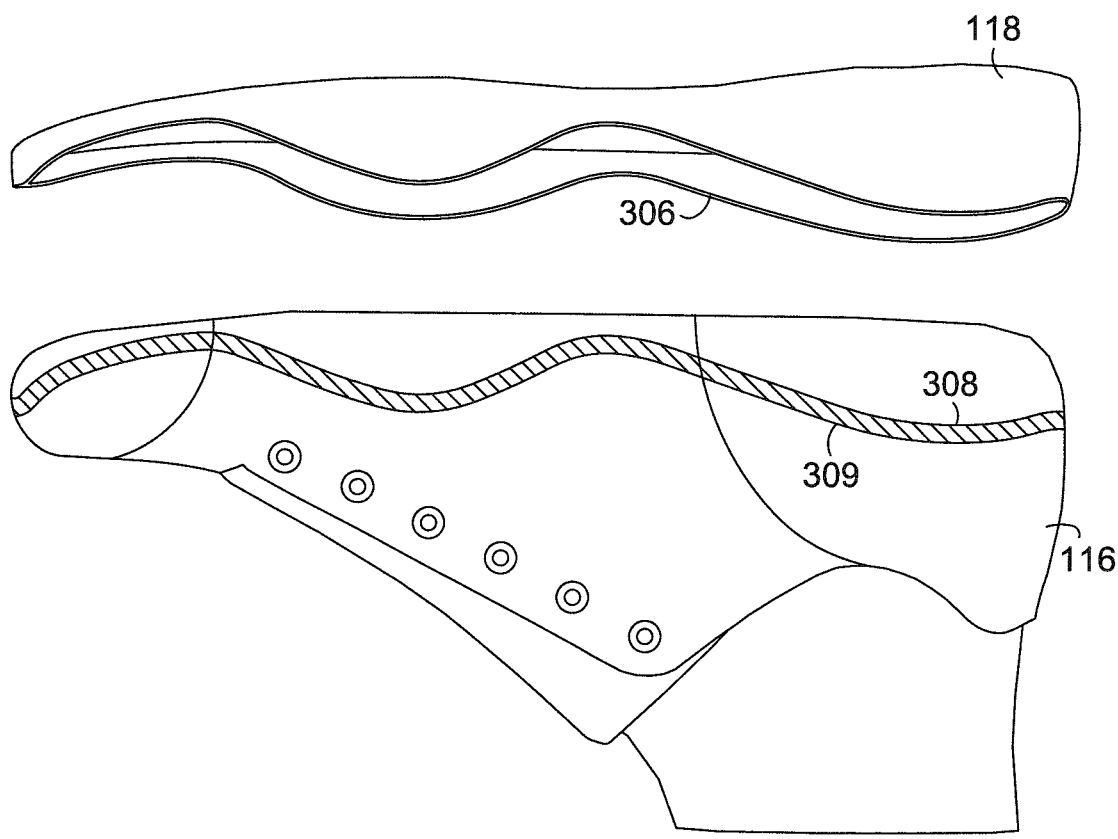
FIG. 20 depicts a diagrammatic view similar to FIG. 19 showing a prospective buffing zone for a shoe upper, in accordance with exemplary aspects hereof.
Figure 21:
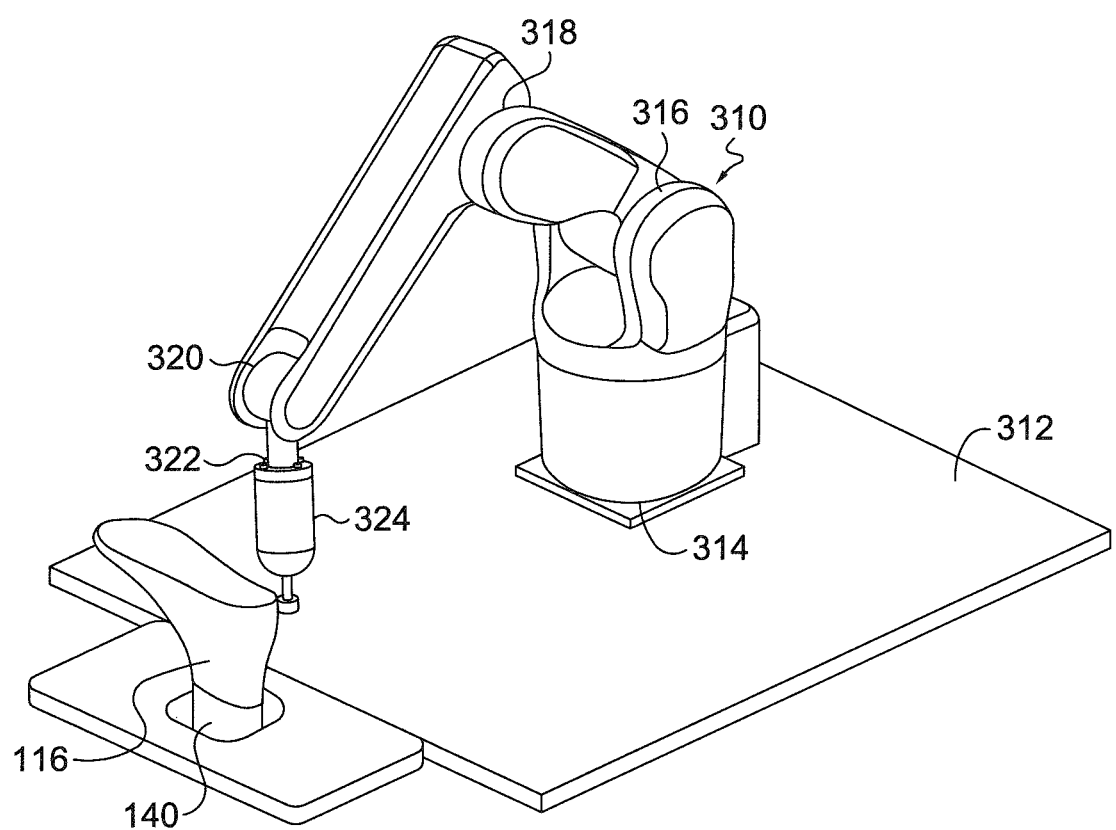
FIG. 21 depicts an exemplary system for automatically buffing a shoe upper, in accordance with exemplary aspects hereof.
Figure 22:
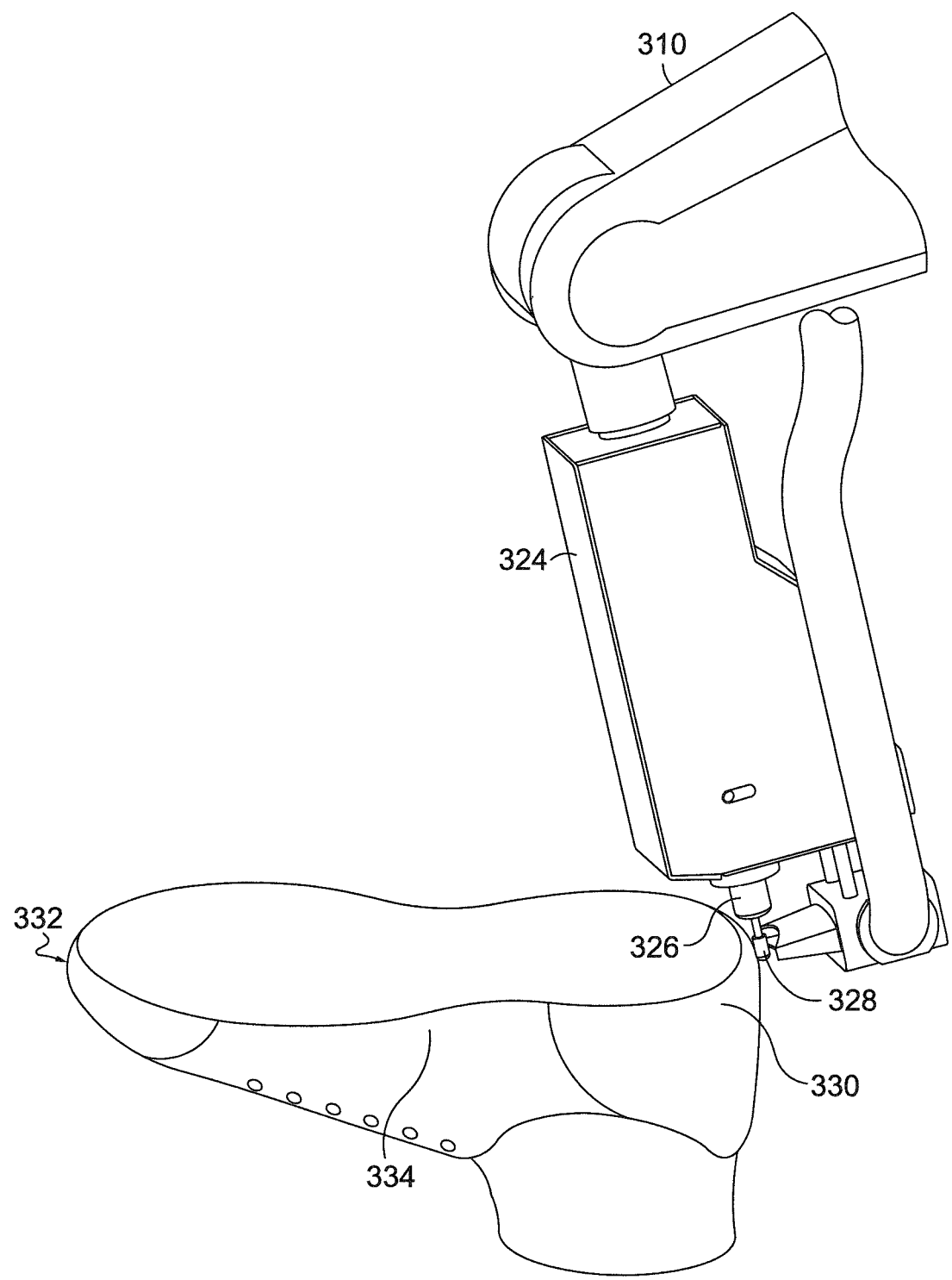
FIG. 22 depicts a focused view of the system in FIG. 21, in accordance with exemplary aspects hereof.

Referring to FIGS. 20-22, the automatic buffing system and method 108 will be described. FIG. 20 is similar to FIG. 19 but showing additionally a buffing zone 308 which is an area on shoe upper 116 which need to be textured or roughed up in order to ensure adequate bonding between the bottom unit 118 and the shoe upper 116. The zone 308 is not actually marked on the shoe upper 116, but represents a tool path stored in a computer memory The tool path is determined based upon the digital bite line data set 184 determined in the automatic bite line determining system and method 102. The computer data is used to ensure that a buffing operation does not occur on any area of the upper 116 that is not covered by the bottom unit 118. Still further as depicted in FIG. 20, after the automatic buffing step 108, the shoe upper 116 will have an actual physical buffing zone 308 thereon.

The actual physically buffed zone 308 includes an edge 309 that is furthest from the bottom unit 118 and that represents the equivalent visual marking on the shoe upper 116 as the marked bite line 248 in FIG. 19. In other words, depending on the operations performed on the shoe upper, either the line 248 or the edge 309 can represent the indication of the actual physical bite line and can be used to ensure alignment of the bottom unit 118 with respect to the upper 116.

FIG. 21 depicts a robotic arm 310 that is capable of being articulated around a shoe upper 116 position on a last 140. The robotic arm is mounted to a base 312 and has articulating and/or rotational joints 314, 316, 318, and 320. The robotic arm includes a distal end 322 onto which a rotary buffing mechanism 324 is attached. The buffing mechanism 324 includes a rotating spindle 326 and a buffing head 328. The buffing head 328 is what performs the buffing operation on the buffing zone 308 of the shoe upper 116. The spindle 326 can be powered in any suitable manner for instance by an electric or pneumatic motor. The buffing mechanism 324 is positioned on a robotic arm 310, for instance, and can be rotated around the circumference of the shoe upper 116 which is held in place on the last 140. In addition to being able to articulate around the circumference of the shoe upper, the robotic arm 310 is able to adjust the angle of the buffing mechanism 324, and thus, the angle of the buffing head 328. This is especially helpful when buffing for instance the heel area 330 and the toe area 332 of the shoe upper 116. However, it may also be necessary to adjust the angle of the apparatus along the side area 334 of the shoe upper 116. Thus, the same set of digital data determined in the automatic buffing system and method 108 is used to perform both the automatic gauge marking 106 and the automatic buffing 108. One exemplary buffing system can be found in U.S. Patent Application No. 62/506,395 which hereby incorporated herein by reference.

Figure 23:
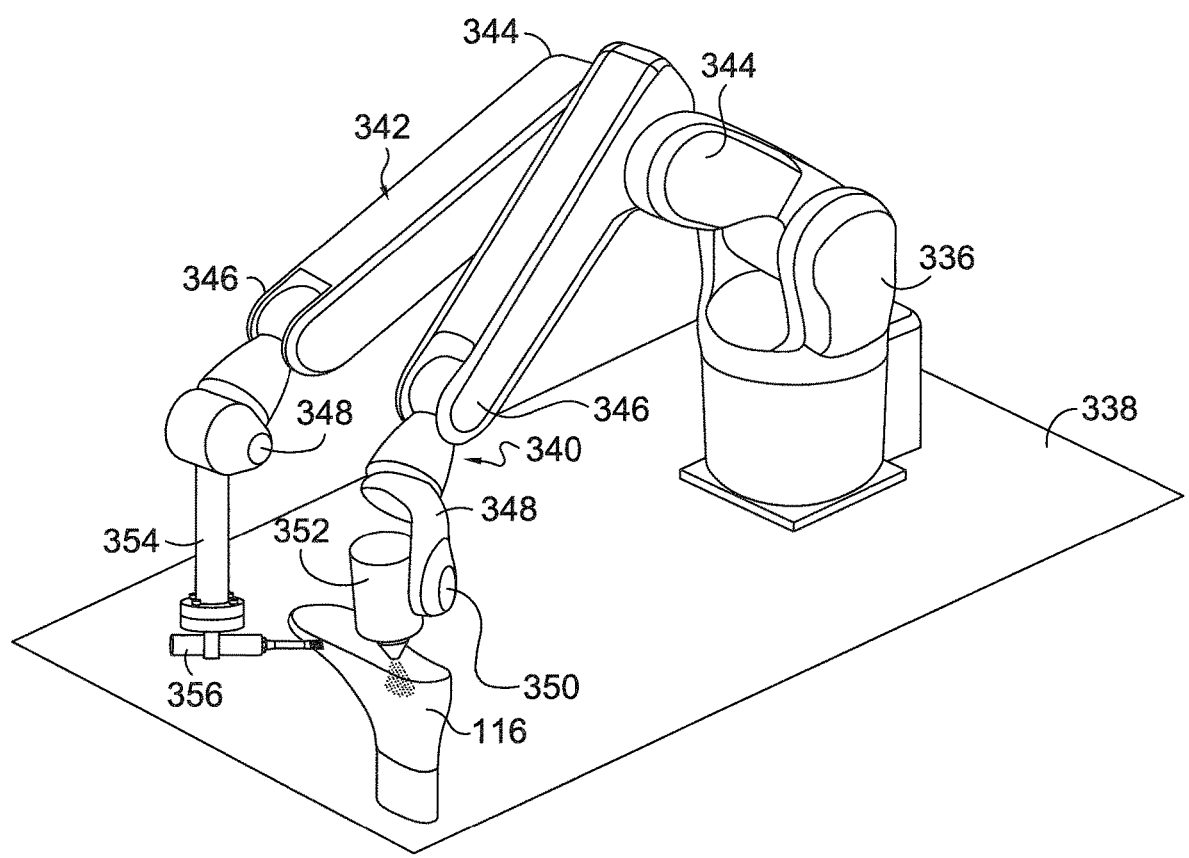
FIG. 23 depicts an exemplary system for automatically spraying and/or brushing a shoe upper with cement, adhesive or primer, in accordance with exemplary aspects hereof.

Referring to FIG. 23, the automatic spraying and/or brushing system and method 112 of the primer and/or the cement onto the lasted shoe upper is described. The digital bite line 184 determined in the automatic bite line determination system and method 102 described above is also used to perform the spraying operation. The automatic spraying and brushing system 112 includes a robotic arm 336 mounted to a base 338. The robotic arm 336 includes two sub arms 340 and 342. Each of arms 340, 342 has articulated joints 344, 346, and 348 that allow the arms to move around a shoe upper 116 to apply cement and/or adhesive. The arm 340 has a distal end 350 to which is mounted a spray mechanism 352 for applying cement, adhesive, or primer. The arm 342 has a distal end 354 to which is mounted a brush mechanism 356 also for applying cement, adhesive or primer. This is but one example of the automated spraying and/or brushing system/method 112 of the primer and/or the cement onto the lasted shoe upper.

As is apparent, once the digital bite line data set 184 is determined in the automatic bite line system/method 102, that same set of data is used to perform the automatic gauge marking system/method 106, the automatic buffing system/method 108, and the automatic spraying/brushing system/method 112. This set up allows efficient use of the stored digital bite line 184 in multiple shoe assembly processes. The digital bite line data 184 is not limited to the systems and methods discussed above, and can be utilized in many other shoe assembly and manufacturing processes.

Figure 24:
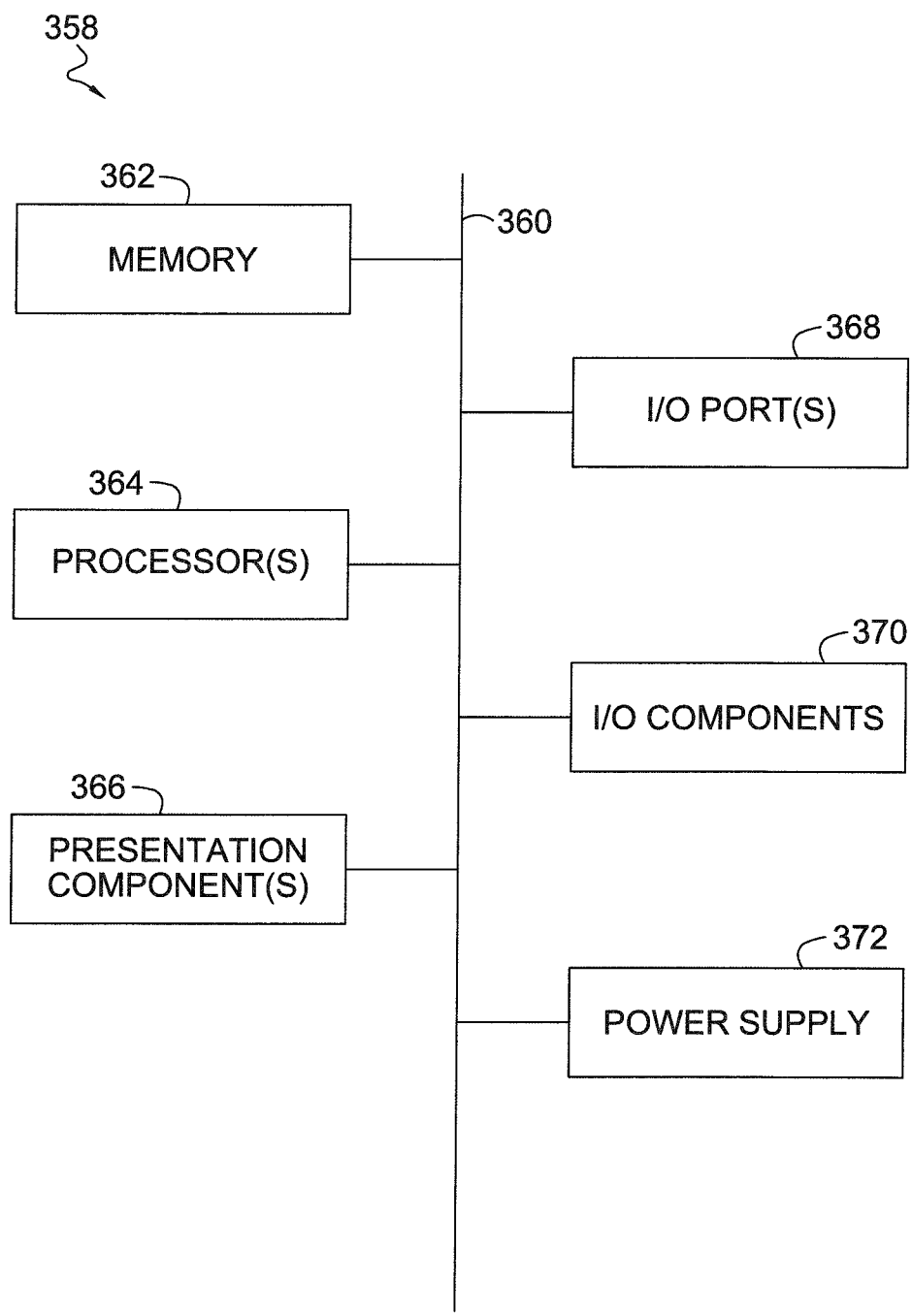
FIG. 24 depicts an exemplary computing operating environment, such as a programmable logic controller and/or a personal computer, for implementing aspects of the invention hereof.

FIG. 24 depicts an exemplary computing operating environment for implementing aspects hereof as shown and designated generally as computing system or device 358. For example, aspects provided herein contemplated using a computing device 358 to store and analyze the three-dimensional surface data to determine a bite line location. Still further, the computing device 358 can be used to access the digital bite line data 184 to perform and control the automatic gauge marking system/method 106, the automatic buffing system/method 108, and the automatic spraying/brushing system/method 112. The computing device 358 is but one example of a suitable computing environment and is not intended to suggest any limitation as to the scope of use or functionality of the invention. Neither should the computing device 358 be interpreted as having any dependency or requirement relating to any one or combination of components illustrated.

Aspects hereof may be described in the general context of computer code or machine-useable instructions, including computer-executable instructions such as program components, being executed by a computer or other machine, such as a programmable logic controller ("PLC"). Generally, program components, including routines, programs, objects, components, data structures, and the like, refer to code that performs particular tasks or implements particular abstract data types. Aspects hereof may be practiced in a variety of system configurations, including handheld devices, consumer electronics, general-purpose computers, personal computers, specialty computing devices, PLC, etc. Aspects hereof may also be practiced in distributed computing environments where tasks are performed by remote-processing devices that are linked through a communications network.

With continued reference to FIG. 24, computing device 358 includes a bus 360 that directly or indirectly couples the following devices: memory 362, one or more processors 364, one or more presentation components 366, input/output (I/O) ports 368, I/O components 370, and an illustrative power supply 372. The bus 360 represents what may be one or more busses (such as an address bus, data bus, or combination thereof). Although the various blocks of FIG. 24 are shown with lines for the sake of clarity, in reality, delineating various components is not so clear, and metaphorically, the lines would more accurately be grey and fuzzy. For example, one may consider a presentation component such as a display device to be an I/O component 370. Also, processors have memory. The inventors hereof recognize that such is the nature of the art, and reiterate that the diagram of FIG. 24 is merely illustrative of an exemplary computing device that can be used in connection with one or more embodiments of the invention. Distinction is not made between such categories as "workstation," "server," "laptop," "handheld device," "tablet," "phone," "node," "PLC," etc., as all are contemplated within the scope of FIG. 24 and refer to "computer" or "computing device." In particular, aspects hereof are contemplated as being performed in whole or in part on one or more components of a distributed computing system. It is contemplated that a distributed computing system may be comprised of processors, networks, and memory that scale to handle as desired level of computing processes at a time. Therefore, it is contemplated that a computing device may also refer to the computing environment of a distributed computing system that dynamically changes with time and/or demand.

Computing device 358 typically includes a variety of computer-readable media. Computer-readable media can be any available media that can be accessed by computing device 358 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data.

Computer-storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 362 includes computer-storage media in the form of volatile and/or nonvolatile memory. The memory 362 may be removable, nonremovable, or a combination thereof. Exemplary memory includes non-transitory, solid-state memory, hard drives, optical-disc drives, etc. Computing device 358 includes one or more processors 364 that read data from various entities such as bus 360, memory 362 or I/O components 370. Presentation component(s) 366 present data indications to a person or other device. Exemplary presentation components 366 include a display device, speaker, printing component, vibrating component, etc. I/O ports 368 allow computing device 358 to be logically coupled to other devices including I/O components 370, some of which may be built in. Illustrative I/O components 370 include a microphone, joystick, game pad, satellite dish, scanner, printer, wireless device, etc.

The invention claimed is:

1. A method for automatically drawing a bite line on a shoe upper comprising:
    scanning a shoe upper model to generate a digital set of data representing a digital bite line;
    accessing from a computing device the digital set of data representing a digital bite line;
    utilizing a robotic arm to support a marking instrument;
    actuating the robotic arm to physically mark on the shoe upper a bite line based upon the digital set of data; and
    maintaining an angle in the range of 45 degrees to 75 degrees between the marking instrument and a surface of the shoe upper.

2. The method of claim 1 wherein the angle of engagement between the marking instrument and the shoe upper is maintained in the range of 55 degrees to 65 degrees.

3. The method of claim 2 wherein the angle of engagement between the marking instrument and the shoe upper is maintained at 60 degrees.

4. The method of claim 1, further comprising:
    changing between a permanent marking instrument and a temporary marking instrument.

5. The method of claim 1 wherein the angle between the marking instrument and the surface of the shoe upper is positioned so that a non-marking end of the marking instrument leads a marking end of the marking instrument as the marking instrument is moved by the robotic arm in the direction of travel about the shoe upper.

6. The method of claim 1 wherein the marking instrument is movable with respect to a distal end of the robotic arm.

7. The method of claim 6 wherein the marking instrument is biased towards the surface of the shoe upper so that the marking instrument maintains contact with the surface of the shoe upper as the robotic arm moves around the upper.

8. An apparatus for automatically marking a bite line on a shoe upper according to the method of claim 1, the apparatus comprising:
    a robotic arm capable of being articulated around the shoe upper and having a distal end capable of engagement with a surface of the shoe upper;
    a marking instrument positioned on the distal end of the robotic arm, wherein the marking instrument has a marking tip for engaging the surface of the shoe upper and for effectuating the bite line; and
    wherein the marking instrument includes a base member and a carriage moveably mounted with respect to the base member and wherein the base member is coupled to the distal end of the robotic arm and the carriage is coupled to the marking tip, such that the carriage and marking tip can move with respect to the base member for adjustment as the marking tip engages the surface of the shoe upper.

9. The apparatus of claim 8 further comprising a biasing member coupled to the base member and the carriage, wherein the biasing member applies a biasing force in a direction towards the surface of the shoe upper.

10. The apparatus of claim 9 wherein the biasing member is a spring.

11. The apparatus of claim 9 wherein the base member includes an adjustable stop member to provide an adjustable end stop for the carriage.

12. The apparatus of claim 8 wherein the carriage is slidably coupled to the base member and moves in a linear manner thereto.

13. The apparatus of claim 12 wherein the base member includes a rail and the carriage includes a slot for engaging the rail so as to effectuate the sliding motion of a slidable coupling.

14. The apparatus of claim 8 wherein the marking instrument is removably coupled to the distal end of the robotic arm and further including a second marking instrument capable of being coupled to the distal end of the robotic arm in place of the marking instrument.

15. The apparatus of claim 14 wherein the carriage of the marking instrument is coupled to a permanent pen.

16. The apparatus of claim 14 wherein the carriage is coupled to a pen that contains ink that vanishes over time.

17. A method for automatically drawing a bite line on a shoe upper comprising:
    generating a digital set of data representing a digital bite line from a shoe upper model;
    storing the digital set of data in a computing device;
    coupling a shoe upper to a last to create a lasted shoe upper;
    marking a bite line on the lasted shoe upper by:
        (1) accessing from the computing device the digital set of data representing the digital bite line;
        (2) utilizing a robotic arm to support a marking instrument;
        (3) actuating the robotic arm around the lasted shoe upper to physically mark a bite line on the shoe upper based upon the digital set of data;

(4) maintaining an angle in the range of 45 degrees to 75 degrees between the marking instrument and a surface of the shoe upper; and after marking the bite line on the lasted shoe upper, coupling a shoe bottom unit to the shoe upper.

* * * * *